US012308749B2

(12) United States Patent
Matsumoto et al.

(10) Patent No.: US 12,308,749 B2
(45) Date of Patent: May 20, 2025

(54) LOW POWER CONSUMING INTEGRATED CIRCUIT FOR POWER SUPPLY CIRCUIT

(71) Applicant: FUJI ELECTRIC CO., LTD., Kawasaki (JP)

(72) Inventors: Hiroaki Matsumoto, Matsumoto (JP); Masayuki Yamadaya, Matsumoto (JP); Yoshinori Kobayashi, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 322 days.

(21) Appl. No.: 17/846,849

(22) Filed: Jun. 22, 2022

(65) Prior Publication Data

US 2023/0051610 A1     Feb. 16, 2023

(30) Foreign Application Priority Data

Aug. 10, 2021  (JP) .................................. 2021-130683

(51) Int. Cl.
*H02M 3/335*     (2006.01)
*H02M 1/00*      (2006.01)
(Continued)

(52) U.S. Cl.
CPC ..... *H02M 3/33569* (2013.01); *H02M 1/0032* (2021.05); *H02M 1/08* (2013.01); *H02M 1/32* (2013.01)

(58) Field of Classification Search
CPC .. H02M 3/33569; H02M 1/0032; H02M 1/32; H02M 1/0006; H02M 1/0035; H02M 1/08
See application file for complete search history.

(56) References Cited

U.S. PATENT DOCUMENTS

| 2016/0141951 | A1* | 5/2016 | Mao | H02M 1/36 363/21.02 |
|---|---|---|---|---|
| 2020/0333873 | A1* | 10/2020 | El Sherif | H02M 1/0032 |
| 2022/0216797 | A1* | 7/2022 | Endo | H02M 1/36 |

FOREIGN PATENT DOCUMENTS

| JP | 2012-110173 A | 6/2012 |
|---|---|---|
| JP | 2013-038857 A | 2/2013 |

(Continued)

OTHER PUBLICATIONS

Japanese Office Action dated Apr. 1, 2025, in the counterpart Japanese Patent Application No. 2021-130683.

*Primary Examiner* — Kyle J Moody
*Assistant Examiner* — Jye-June Lee
(74) *Attorney, Agent, or Firm* — Rabin & Berdo, P.C.

(57) ABSTRACT

An integrated circuit for a power supply including a power transistor, the integrated circuit being configured to switch and drive the power transistor. The integrated circuit includes: a first terminal to which a first switch is coupled; a first determination circuit configured to determine, based on a voltage level at the first terminal, whether to operate the integrated circuit in a first mode or a second mode, a power consumption in the second mode being greater than a power consumption in the first mode; a first power supply voltage generation circuit configured to stop generating a first power supply voltage when the integrated circuit operates in the first mode, and generate the first power supply voltage when the integrated circuit operates in the second mode; and a driver circuit configured to receive the first power supply voltage, to switch and drive the power transistor.

20 Claims, 18 Drawing Sheets

(51) Int. Cl.
  *H02M 1/08* (2006.01)
  *H02M 1/32* (2007.01)

(56) References Cited

FOREIGN PATENT DOCUMENTS

| JP | 2014-230377 A | 12/2014 |
| JP | 2016-111758 A | 6/2016 |
| JP | 2017-017767 A | 1/2017 |
| JP | 2017-060329 A | 3/2017 |
| JP | 2017-127109 A | 7/2017 |
| JP | 2019047655 A | 3/2019 |

* cited by examiner

| | |
|---|---|
| Rstb | METHOD (CONTROL IC 50) |
| Ra | EXTERNAL MODE |
| Rb | INTERNAL MODE |

FIG. 6

| Wakeup | ExtSTB | OPERATION MODE (CONTROL IC 50) |
|---|---|---|
| H | H | ENERGIZATION (LOW STANDBY POWER) |
| | L | ENERGIZATION (NORMAL) |
| L | NA | INTERRUPTION (NO SWITCHING) |

FIG. 11

| Wakeup | AC INPUT | OPERATION MODE (CONTROL IC 50) | PULSE | OPERATION MODE (POWER FACTOR CORRECTION IC 175) |
|---|---|---|---|---|
| H | 100V | ENERGIZATION (NORMAL) | (a):T1, TWO | CONTINUOUS SWITCHING |
| H | 100V | ENERGIZATION (LOW STANDBY POWER) | (b):T2, TWO | INTERMITTENT SWITCHING |
| H | 200V | ENERGIZATION (NORMAL) | (c):T1, ONE | CONTINUOUS SWITCHING |
| H | 200V | ENERGIZATION (LOW STANDBY POWER) | (d):T2, ONE | INTERMITTENT SWITCHING |
| H | COMMON | NA | (e):T3, CONTINUOUS | STOP |
| L | NA | INTERRUPTION (NO SWITCHING) | NA | STOP |

FIG. 17

LOW POWER CONSUMING INTEGRATED CIRCUIT FOR POWER SUPPLY CIRCUIT

CROSS-REFERENCE TO RELATED APPLICATION

The present application claims priority pursuant to 35 U.S.C. § 119 from Japanese patent application number 2021-130683 filed on Aug. 10, 2021, the entire disclosure of which is hereby incorporated by reference herein.

BACKGROUND

Technical Field

The present disclosure relates to an integrated circuit and a power supply circuit.

Description of the Related Art

There have been integrated circuits for controlling a power supply circuit (for example, Japanese Patent Application Publication Nos. 2012-110173, 2013-038857, 2014-230377, 2016-111758, 2017-017767, 2017-060329, and 2017-127109).

Some of the integrated circuits change an operation mode depending on the state of a load of the power supply circuit.

In such an integrated circuit, generally a load detection circuit that detects the state of the load constantly operates. Accordingly, even if the load is in no-load state, the integrated circuit continue to consume a certain amount of power. This makes it difficult to further reduce the power consumption of the integrated circuit.

SUMMARY

A first aspect of an embodiment of the present disclosure is an integrated circuit for a power supply circuit configured to generate an output voltage at a target level, the power supply circuit including a power transistor, the integrated circuit being configured to switch and drive the power transistor, and a first switch configured to be turned on and off in response to an instruction signal instructing an operation mode of the integrated circuit, the operation mode including a first mode and a second mode, a power consumption in the second mode being greater than a power consumption in the first mode, the integrated circuit comprising: a first terminal to which the first switch is coupled; a first determination circuit configured to determine, based on a voltage level at the first terminal, whether to operate the integrated circuit in the first mode or the second mode; a first power supply voltage generation circuit configured to stop generating a first power supply voltage when the integrated circuit operates in the first mode, and generate the first power supply voltage when the integrated circuit operates in the second mode; and a driver circuit configured to receive the first power supply voltage, to thereby switch and drive the power transistor.

A second aspect of an embodiment of the present disclosure is a power supply circuit configured to generate an output voltage at a target level, the power supply circuit comprising: a power transistor; an integrated circuit configured to drive the power transistor; and a first switch configured to be turned on and off in response to an instruction signal instructing an operation mode of the integrated circuit, the operation mode including a first mode and a second mode, a power consumption in the second mode being greater than a power consumption in the first mode, wherein the integrated circuit includes a first terminal to which the first switch is coupled, a first determination circuit configured to determine, based on a voltage level at the first terminal, whether to operate the integrated circuit in the first mode or the second mode, a first power supply voltage generation circuit configured to stop generating a first power supply voltage when the integrated circuit operates in the first mode, and generate the first power supply voltage when the integrated circuit operates in the second mode, and a driver circuit configured to receive the first power supply voltage, to thereby switch and drive the power transistor.

A third aspect of an embodiment of the present disclosure is an integrated circuit for a power supply circuit configured to generate an output voltage at a target level, the power supply circuit including a power transistor, the integrated circuit being configured to switch and drive the power transistor, the integrated circuit comprising: a first terminal to which an external circuit is coupled, the external circuit being configured to set an operation mode of the integrated circuit, the operation mode including an interruption mode in which no switching operation is performed, a normal mode in which a switching operation is continuously performed, and a low standby power mode in which a switching operation period and a stop operation period alternately repeat; and a mode selection circuit configured to select, based on a voltage level at the first terminal, whether the integrated circuit operates in the interruption mode, the normal mode, or the low standby power mode.

BRIEF DESCRIPTION OF THE DRAWINGS

FIG. 6 is a diagram illustrating a relationship between a resistance value of a resistor Rstb and a method of changing a driving pattern of a control IC 50.

FIG. 9 is a diagram illustrating an example of an interface (IF) circuit 18a.

FIG. 11 is a diagram illustrating a relationship between logic levels of a signal Wakeup and a signal ExtSTB and an operation mode of a control IC 50.

FIG. 17 is a diagram illustrating a relationship between a logic level of a signal Wakeup and operation modes of a control IC 50 and a power factor correction IC 175.

DETAILED DESCRIPTION

At least following matters will become apparent from the descriptions of the present specification and the accompanying drawings.

Embodiments

<<<Overview of Power Device 10>>>

Figure 1:
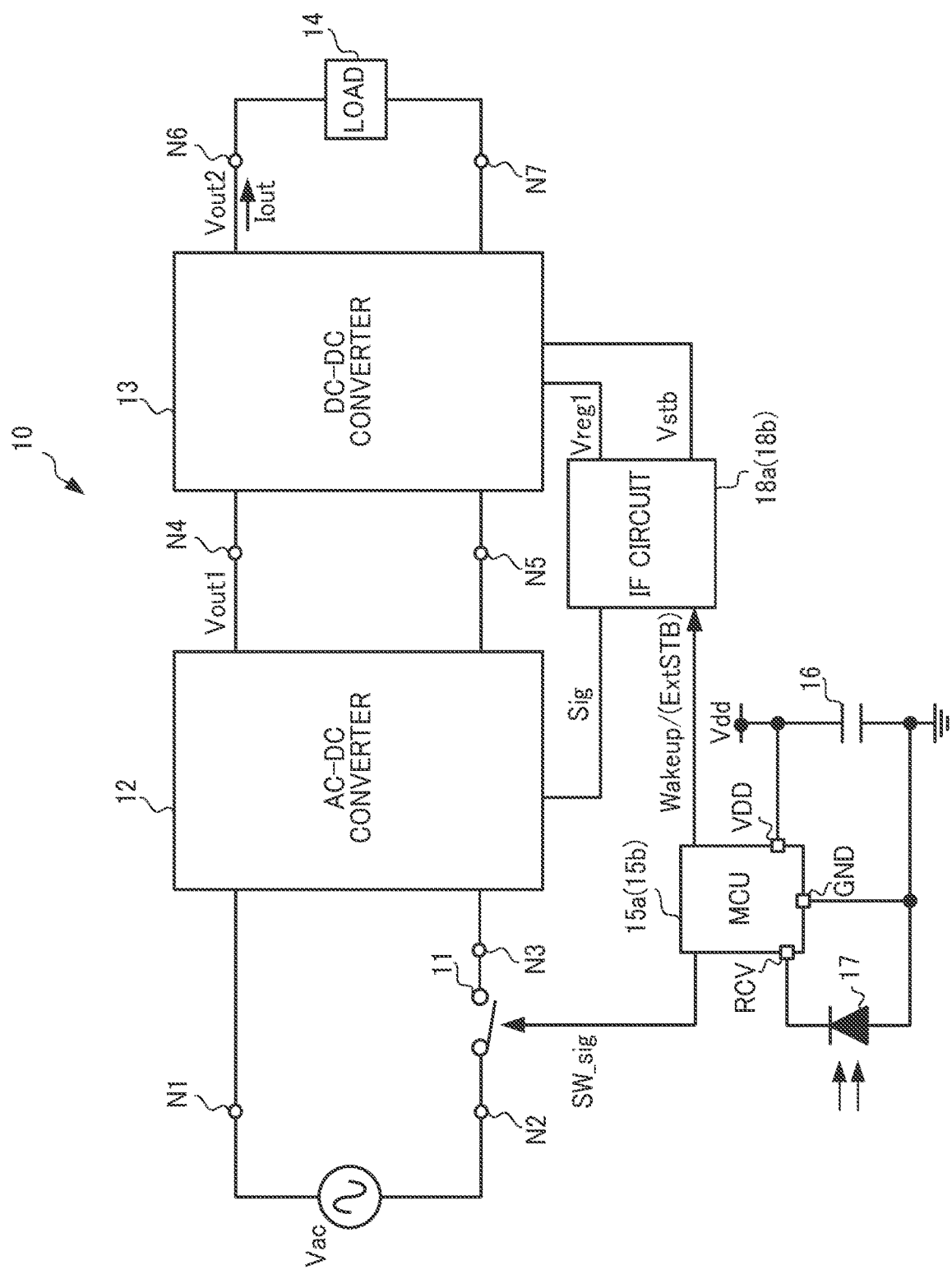
FIG. 1 is a diagram illustrating an example of a power supply device 10.

FIG. 1 is a diagram illustrating an example of a power supply device 10. The power supply device 10 is a device incorporated in a television, for example, and generates an output voltage Vout2 from a commercial alternating current (AC) voltage Vac and supplies power to a predetermined load 14. The power supply device 10 includes a switch 11, an AC-DC converter 12, a DC-DC converter 13, a microcontroller (MCU) 15a, a capacitor 16, a photodiode 17, and an interface (IF) circuit 18a. The switch 11 is provided between a node N2 and a node N3, to be turned on and off in response to a signal SW_sig from the microcontroller 15a.

When the switch 11 is turned on, the AC-DC converter 12 generates an output voltage Vout1 from the AC voltage Vac applied to a node N1 and the node N2. On the other hand, when the switch 11 is turned off, the AC-DC converter 12 does not generate the output voltage Vout1 because no AC voltage Vac is applied thereto.

The DC-DC converter 13 generates the output voltage Vout2 from the output voltage Vout1 applied to nodes N4 and N5. The load 14 is coupled to nodes N6 and N7, to receive the output voltage Vout2 and a load current Iout, to thereby operate. The load 14 is an electronic device that is included in the television, for example, and operates at a DC voltage. Unless otherwise specified, "couple" herein means a state of electrically coupling and, in other words, includes coupling through a resistor.

The microcontroller 15a controls the power supply device 10 based on an instruction from a user. The microcontroller 15a receives a voltage Vdd from a power supply circuit (not illustrated), to thereby operate, the power supply circuit being configured to operate based on the commercial AC voltage Vac, and the capacitor 16 is provided between a terminal VDD and the ground so as to stabilize the voltage Vdd.

The photodiode 17 is provided between a terminal RCV and the ground, to receive a signal using infrared light from a remote controller of the television (not illustrated), for example. The microcontroller 15a controls an operation of the power supply device 10 and various devices in the television (not illustrated) in response to the signal received by the photodiode 17.

In response to the photodiode 17 receiving the signal transmitted from the remote controller to turn on the load 14, the microcontroller 15a transmits the signal SW_sig to turn on the switch 11 serving as a relay. As a result, the switch 11 is turned on, to thereby apply the AC voltage Vac to the AC-DC converter 12. Then, the AC-DC converter 12 generates the output voltage Vout1.

In this process, the microcontroller 15a outputs a signal Wakeup to activate the DC-DC converter 13 to the interface circuit 18a.

The DC-DC converter 13 is activated based on a voltage Vstb from the interface circuit 18a, to supply power to the load 14. In a predetermined case, the microcontroller 15a also outputs a signal ExtSTB to change an operation mode of the DC-DC converter 13, and details will be described later.

On the other hand, in response to the photodiode 17 receiving the signal transmitted from the remote controller to turn off the load 14, the microcontroller 15a transmits the signal SW_sig to turn off the switch 11. As a result, the switch 11 is turned off, to thereby stop supplying the AC voltage Vac to the AC-DC converter 12.

In this process, the microcontroller 15a outputs the signal Wakeup to stop the DC-DC converter 13 to the interface circuit 18a. This causes the interface circuit 18a to generate the voltage Vstb at a level higher than a predetermined level, and details will be described later. Upon receipt of the voltage Vstb, the DC-DC converter 13 stops generating the output voltage Vout2, to thereby stop supplying power to the load 14, and thus the load current Iout flowing through the load 14 reaches zero, which results in the load 14 being in a so-called no-load state.

In response to the signal Wakeup and the signal ExtSTB from the microcontroller 15a, the interface circuit 18a changes an operation of the control IC 50 and implements a cooperation function between the control IC 50 and a power factor correction IC 175. Details of the interface circuit 18a will be described later. The interface circuit 18a corresponds to an "external circuit".

<<<Overview of AC-DC Converter>>>

Figure 2:
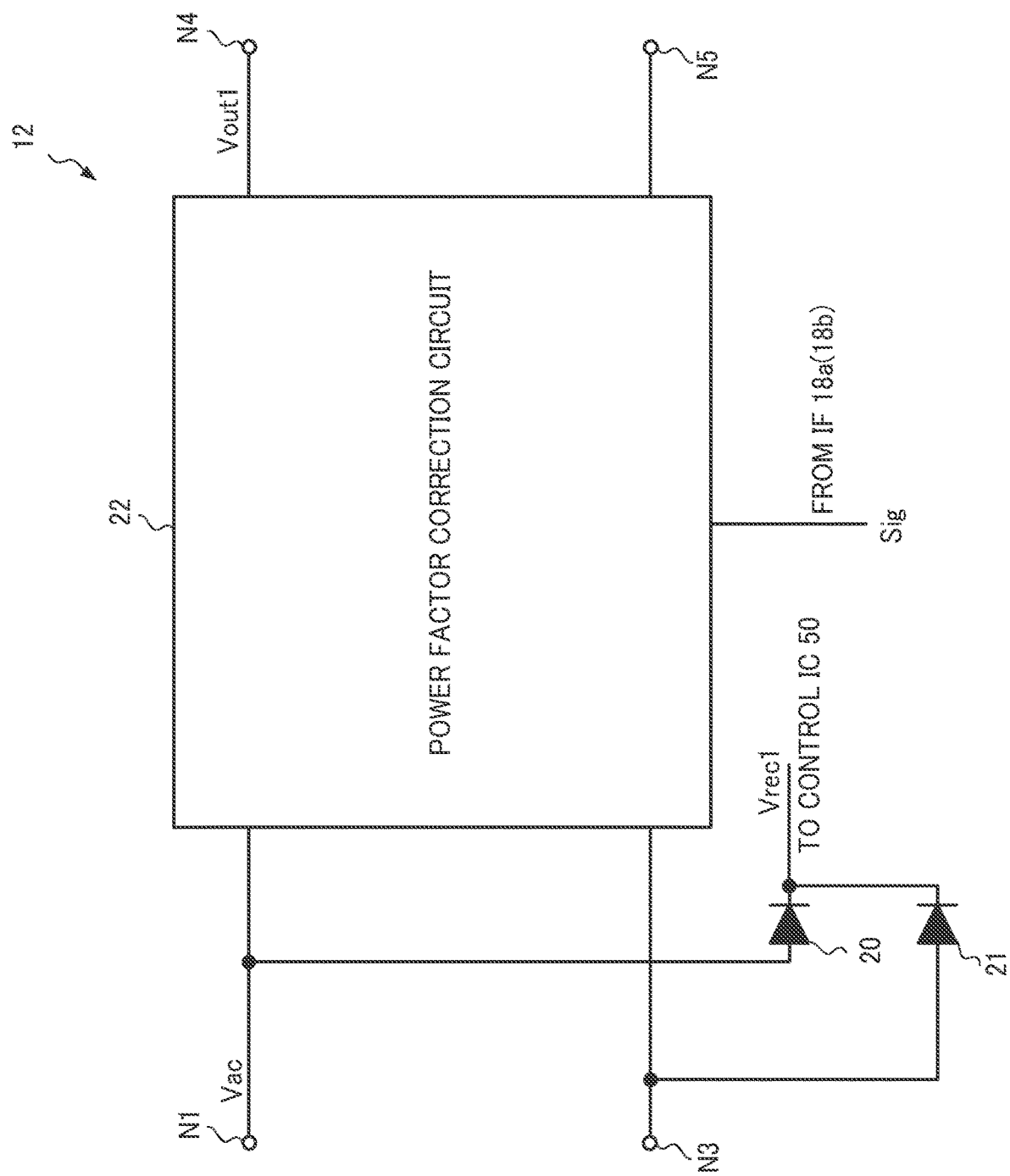
FIG. 2 is a diagram illustrating an overview of an AC-DC converter 12.

FIG. 2 is a diagram illustrating a configuration of the AC-DC converter 12 included in the power supply device 10 according to an embodiment of the present disclosure. The AC-DC converter 12 is a power supply circuit that generates the output voltage Vout1 at a target level from the AC voltage Vac of the commercial power supply.

The AC-DC converter 12 includes diodes 20 and 21 and a power factor correction circuit 22. The diodes 20 and 21 full-wave rectify the AC voltage Vac from the nodes N1 and N3, to apply the resultant voltage to the control IC 50, which will be describe later, as a rectified voltage Vrec1.

The power factor correction circuit 22 generates the output voltage Vout1 at a target level from the AC voltage Vac of the commercial power supply based on a voltage Sig from the interface circuit 18a, to apply the output voltage Vout1 to the nodes N4 and N5. Details of the power factor correction circuit 22 will be described later.

<<<Overview of DC-DC Converter 13>>>

Figure 3:
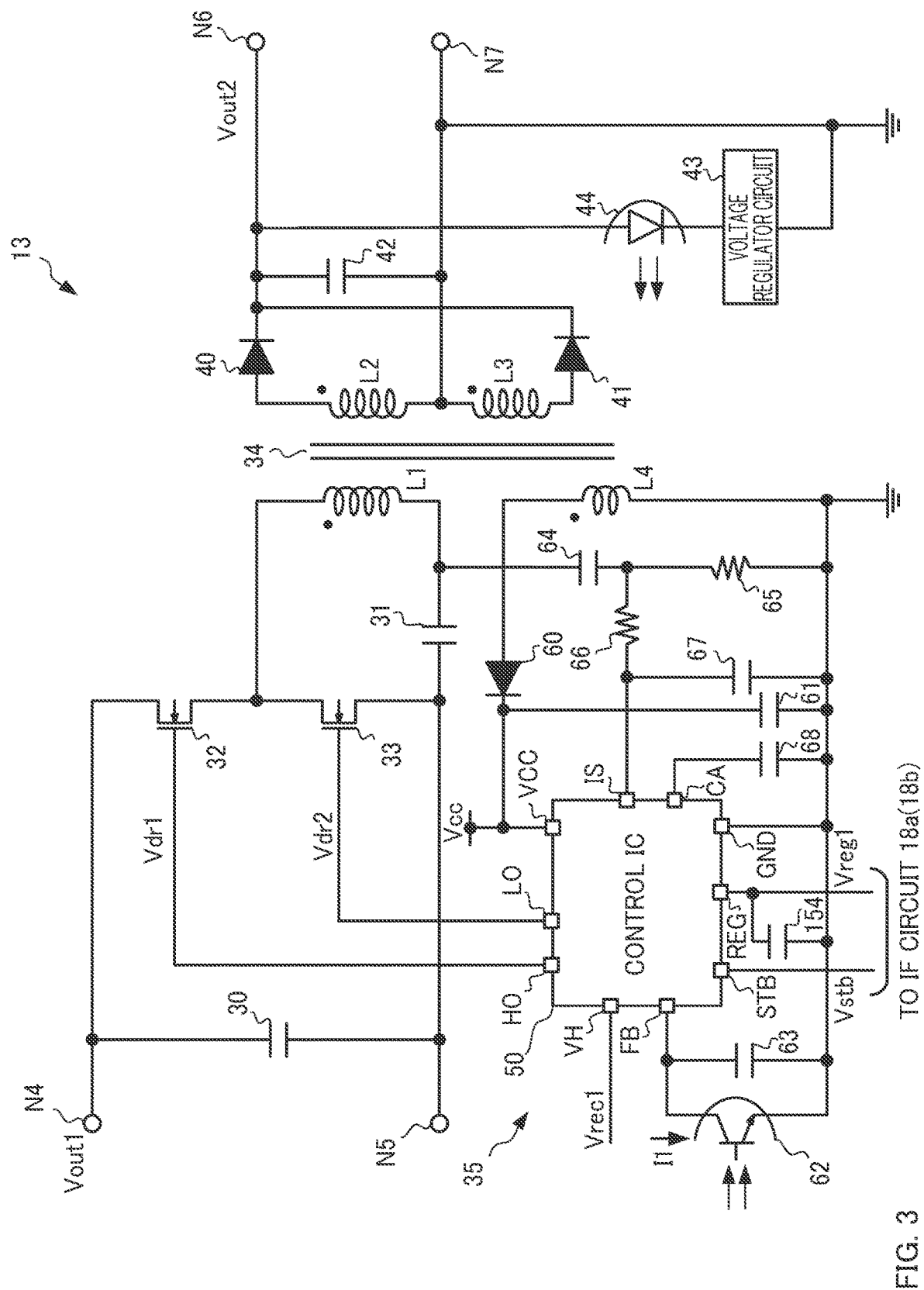
FIG. 3 is a diagram illustrating an example of a DC-DC converter 13.

FIG. 3 is a diagram illustrating a configuration of the DC-DC converter 13 included in the power supply device 10 according to an embodiment of the present disclosure. The DC-DC converter 13 is an LLC current resonant power supply circuit that generates, at the load 14, the output voltage Vout2 at a target level (e.g., 15 V) from a predetermined input voltage Vout1 (e.g., 400 V).

The DC-DC converter 13 includes capacitors 30, 31, and 42, N-channel metal-oxide-semiconductor (NMOS) transistors 32 and 33, a transformer 34, a control block 35, diodes 40 and 41, a voltage regulator circuit 43, and a light-emitting diode 44.

The capacitor 30 stabilizes a voltage between a power supply line that receives the input voltage Vout1 and a ground line on a ground side, to remove noise and the like. The input voltage Vout1 is a direct-current (DC) voltage at a predetermined level.

The NMOS transistor 32 is a high-side power transistor, and the NMOS transistor 33 is a low-side power transistor.

In an embodiment of the present disclosure, the NMOS transistors 32 and 33 are used as switching devices, however, for example, P-channel metal-oxide-semiconductor (PMOS) transistors or bipolar transistors may be used.

The transformer 34 includes a primary coil L1, secondary coils L2 and L3, and an auxiliary coil L4. The primary coil L1, the secondary coils L2 and L3, and the auxiliary coil L4 are insulated from one another. In the transformer 34, a voltage across the primary coil L1 on a primary side vary, to thereby generate voltages across the secondary coils L2 and L3 on a secondary side, and the voltages across the secondary coils L2 and L3 vary, to thereby generate a voltage across the auxiliary coil L4 on the primary side.

The primary coil L1 has one end coupled to a source of the NMOS transistor 32 and a drain of the NMOS transistor 33, and the other end coupled to a source of the NMOS transistor 33 through the capacitor 31.

Accordingly, in response to the NMOS transistors 32 and 33 start being switched, the respective voltages across the secondary coils L2 and L3 and the auxiliary coil L4 vary. The primary coil L1 and the secondary coils L2 and L3 are electromagnetically coupled with the same polarity, and the secondary coils L2 and L3 and the auxiliary coil L4 are also electromagnetically coupled with the same polarity.

The control block 35 is a circuit block to control the switching of the NMOS transistors 32 and 33, and details will be described later.

The diodes 40 and 41 rectifies the voltages across the secondary coils L2 and L3, and the capacitor 42 smooths the rectified voltages. As a result, the smoothed output voltage Vout2 is generated across the capacitor 42. The output voltage Vout2 results in reaching a DC voltage at a target level.

The voltage regulator circuit 43 generates a constant DC voltage, and is configured using, for example, a shunt regulator.

The light-emitting diode 44 is an element that emits light of an intensity corresponding to the difference between the output voltage Vout2 and an output of the voltage regulator circuit 43, and configures a photocoupler with a phototransistor 62 which will be described later. In an embodiment of the present disclosure, with a rise in the level of the output voltage Vout2, the intensity of the light from the light-emitting diode 44 increases.

===Control Block 35===

The control block 35 includes the control IC 50, a diode 60, capacitors 61, 63, 64, 67, 68, and 154, a phototransistor 62, and resistors 65 and 66.

The control IC 50 is, for example, an integrated circuit that controls switching of the NMOS transistors 32 and 33 according to the state of a terminal STB, which will be described later, and has terminals VCC, GND, STB, REG, FB, IS, CA, HO, LO, and VH.

The terminal VCC is a terminal to receive a voltage Vcc to operate the control IC 50. A cathode of the diode 60 and the capacitor 61 having one end grounded are coupled to the terminal VCC. Thus, the capacitor 61 is charged with a current from an activation circuit 70 (described later) of the control IC 50 or a current from the diode 60, and the charge voltage of the capacitor 61 is the voltage Vcc to operate the control IC 50.

The terminal GND is a terminal to receive a ground voltage, and is coupled to a housing or the like of an apparatus where the power supply device 10 is provided, for example.

The terminal STB is a terminal to receive the voltage generated by the interface circuit 18a or allow the control IC 50 to output a signal therethrough to the power factor correction IC 175, which will be described later. Details will be described later.

Figure 9:
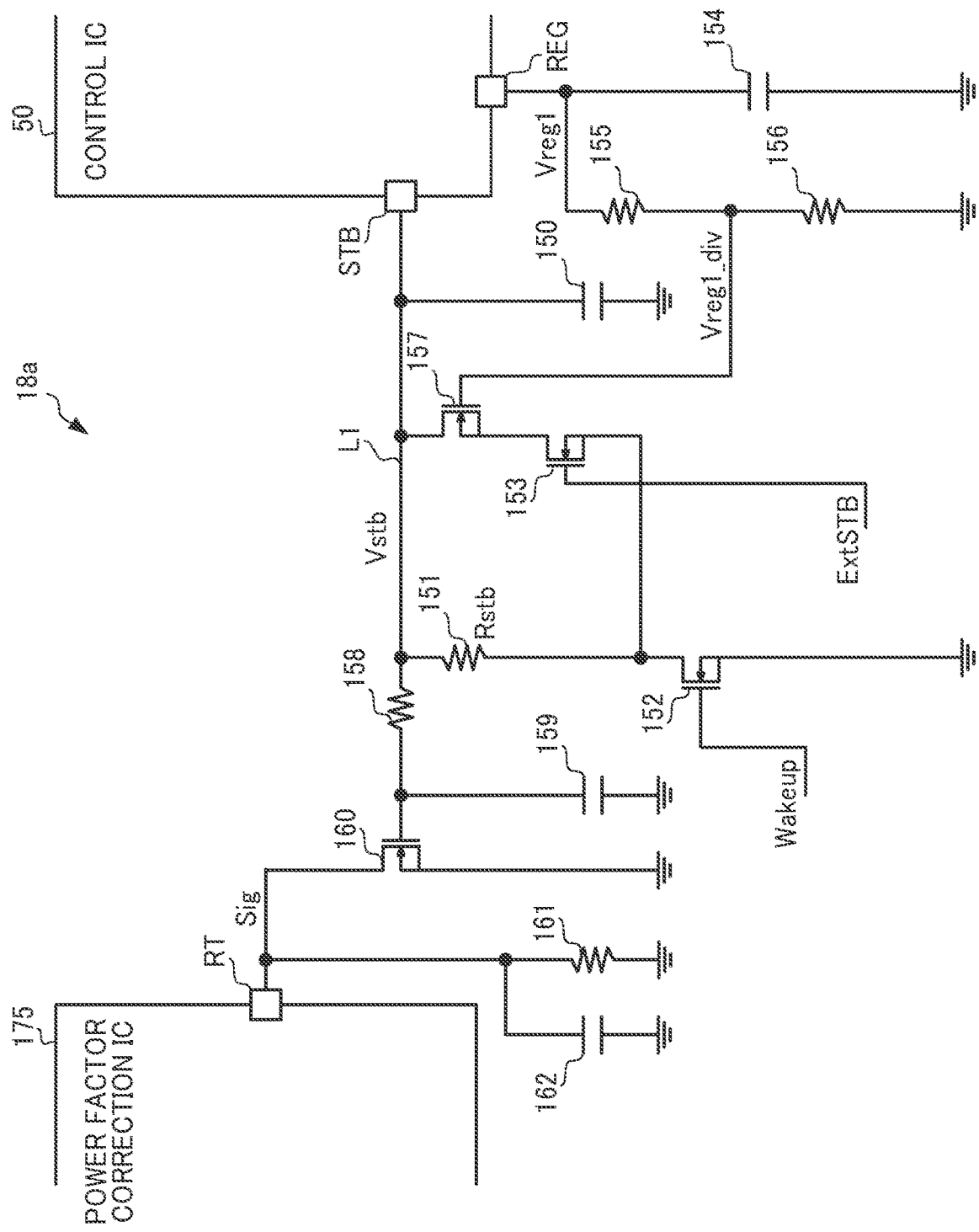

The terminal REG is a terminal to output an output voltage of an internal power supply (REG1) 92 (described later) incorporated in the control IC 50. In order to stabilize the output voltage of the internal power supply 92, the capacitor 154 is provided between the terminal REG and the ground as illustrated in FIG. 9, which will be described later, and details will be described later.

The terminal FB is a terminal at which a feedback voltage Vfb_a corresponding to the output voltage Vout2 is generated and the phototransistor 62 and the capacitor 63 are coupled to the terminal FB. The phototransistor 62 allows a bias current I1 with a magnitude corresponding to the intensity of the light from the light-emitting diode 44 to flow from the terminal FB therethrough to the ground, and the capacitor 63 is provided to remove noise between the terminal FB and the ground. Thus, the phototransistor 62 operates as a transistor that generates a sink current.

The terminal IS is a terminal to receive a voltage corresponding to a resonant current of the DC-DC converter 13. In this case, at a node at which the capacitor 64 and the resistor 65 are coupled, a voltage corresponding to a current value of a resonant current of the primary coil L1 is generated. The resistor 66 and the capacitor 67 configure a low-pass filter. Thus, a voltage obtained by removing a noise component is applied to the terminal IS, according to a current value of the resonant current of the primary coil L1.

The current value of the resonant current increases according to input power of the DC-DC converter 13, and the input power of the DC-DC converter 13 increases according to the power consumed by the load 14. Thus, the voltage applied to the terminal IS is at a voltage corresponding to the power consumption of the load 14.

The terminal CA is a terminal to apply, to the capacitor 68, a voltage that changes according to the voltage applied to the terminal IS. Specifically, with an increase in the power consumption of the load 14, in other words, in response to the state of the load 14 becoming a heavy load, the voltage applied to the capacitor 68 rises. On the other hand, with a decrease in the power consumption of the load 14, in other words, in response to the state of the load 14 becoming a light load, the voltage applied to the capacitor 68 drops.

"The state of the load 14 becomes a heavy load" means, for example, a case where a current value of the load current Iout flowing through the load 14 is greater than a predetermined value (e.g., 1 A). "The state of the load 14 becomes a light load" means, for example, a case where the current value of the load current Iout flowing through the load 14 is smaller than the predetermined value (e.g., 1 A).

The terminal VH is a terminal to receive the rectified voltage Vrec1. Note that the control IC 50 includes the activation circuit 70 (described later) that activates the control IC 50 by charging with the voltage Vcc upon receipt of the rectified voltage Vrec1 through the terminal VH, and after the activation, the control IC 50 operates based on the voltage Vcc.

The terminal HO is a terminal to output a driving signal Vdr1 to drive the NMOS transistor 32, and a gate of the NMOS transistor 32 is coupled to the terminal HO.

The terminal LO is a terminal to output a driving signal Vdr2 to drive the NMOS transistor 33, and a gate of the NMOS transistor 33 is coupled to the terminal LO.

Note that the terminal STB corresponds to a "first terminal", the terminal VH corresponds to a "second terminal", the terminal VCC corresponds to a "third terminal", and the terminal REG corresponds to a "fourth terminal".

<<<Details of Control IC 50>>>

Figure 4:
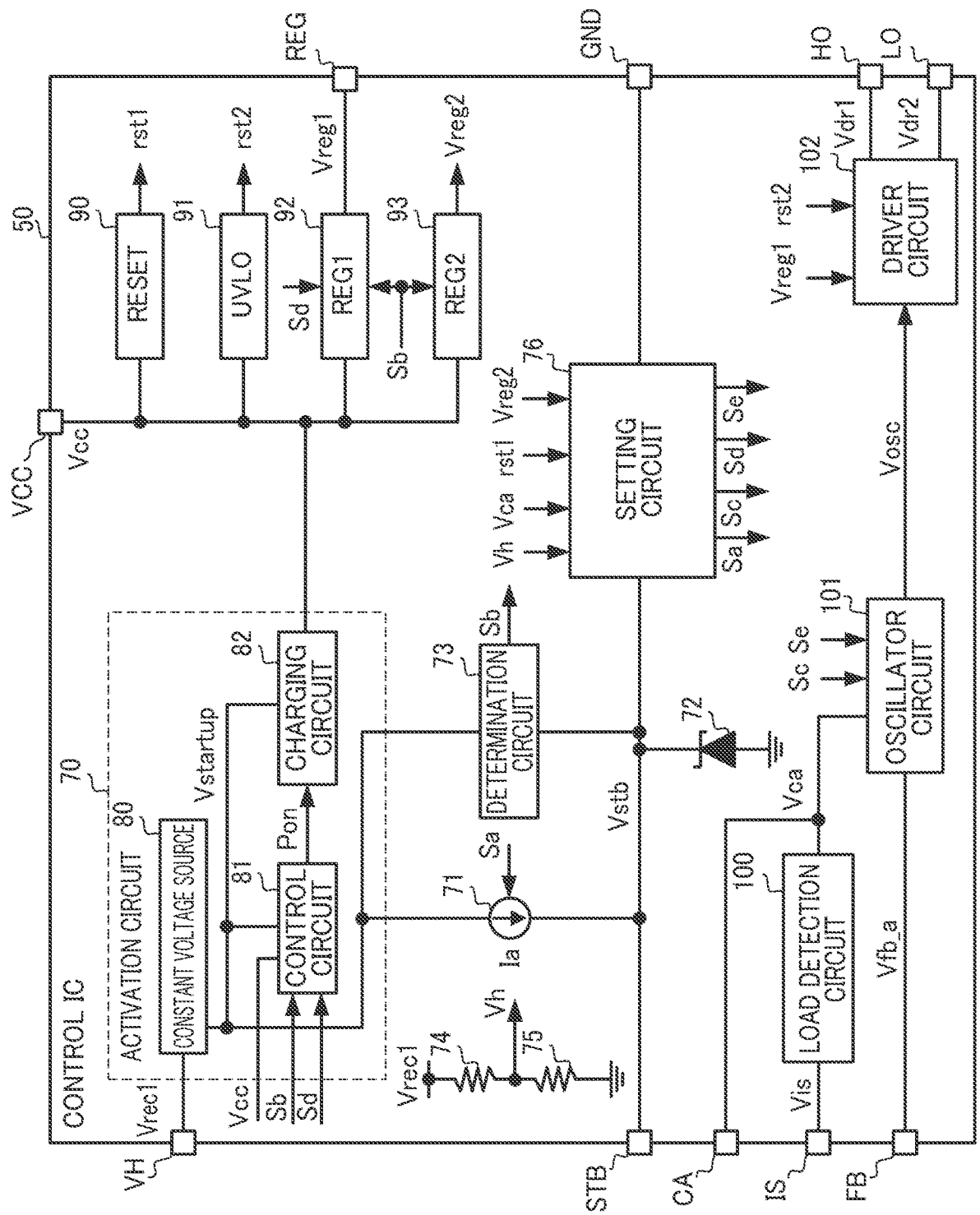
FIG. 4 is a diagram illustrating an example of a control IC 50.

FIG. 4 is a diagram illustrating a configuration of the control IC 50. The control IC 50 is an integrated circuit to control an LLC current resonant power supply circuit. The control IC 50 includes the activation circuit 70, a current source 71, a Zener diode 72, a determination circuit 73, resistors 74 and 75, a setting circuit 76, a reset circuit (RESET) 90, a under voltage protection circuit (UVLO) 91, the internal power supply (REG1) 92, an internal power supply (REG2) 93, a load detection circuit 100, an oscillator circuit 101, and a driver circuit 102. Note that the determination circuit 73 corresponds to a "first determination circuit" or a "first mode determination circuit".

===Activation Circuit 70===

When the control IC 50 is activated, the activation circuit 70 generates, based on the rectified voltage Vrec1, the power supply voltage Vcc to operate the control IC 50. Specifically, at the time of the activation of the control IC 50, the activation circuit 70 charges the capacitor 61 in FIG. 3 with a voltage that is generated from the rectified voltage Vrec1 applied through the terminal VH, based on the voltage Vcc at the terminal VCC, to thereby generate the voltage Vcc.

In response to the voltage Vcc sufficiently rising and the capacitor 61 starting to be charged with a current from the auxiliary coil L4 by virtue of the completion of the activation of the control IC 50, the activation circuit 70 stops charging the capacitor 61.

The "activation" herein refers to an operation from when a signal rst1 (described later) to operate a digital circuit of the control IC 50 is outputted after the AC voltage Vac is applied to the power supply device 10 to when a signal rst2 (described later) to start the switching is outputted.

The "activation" of the control IC 50 includes operations indicated in the following steps (1) and (2). As the step (1), a "state setting period" for initially setting various circuits of the control IC 50 has elapsed after the AC voltage Vac is applied to the power supply device 10. As the step (2), after the step (1), the activation circuit 70 charges the capacitor 61 such that the level of the voltage Vcc reaches a level at which the control IC 50 starts switching the NMOS transistors 32 and 33 (e.g., a predetermined level Vccon described later). Details of the steps (1) and (2) will be described later. The activation circuit 70 according to an embodiment of the present disclosure includes a constant voltage source 80, a control circuit 81, and a charging circuit 82.

<<Constant Voltage Source 80>>

The constant voltage source 80 generates a constant voltage Vstartup (e.g., 30 V) based on the rectified voltage Vrec1. Specifically, irrespective of the operation mode of the control IC 50, the constant voltage source 80 generates the constant voltage Vstartup based on the rectified voltage Vrec1 applied through the terminal VH.

While the rectified voltage Vrec1 is being applied to the terminal VH, the constant voltage source 80 applies the constant voltage Vstartup to the control circuit 81, the charging circuit 82, the current source 71, and the determination circuit 73. The constant voltage Vstartup corresponds to a "predetermined voltage".

<<Control Circuit 81>>

The control circuit 81 controls the charging circuit 82 so as to generate the voltage Vcc. During a time period from the step (1) to the step (2) when the control IC 50 is activated as described above, the control circuit 81 controls the charging circuit 82.

Specifically, in response to receiving, from the determination circuit 73, a signal Sb indicating that the switching of the NMOS transistors 32 and 33 in FIG. 3 should be started, the control circuit 81 outputs a signal Pon to control the charging circuit 82 according to a voltage value of the voltage Vcc. Hereinafter, the signal Sb when indicating that the switching of the NMOS transistors 32 and 33 should be started is referred to as "signal Sb to perform the switching".

On the other hand, in response to receiving, from the determination circuit 73, the signal Sb indicating that the switching of the NMOS transistors 32 and 33 should be stopped, the control circuit 81 outputs the signal Pon for the charging circuit 82 to stop generating the voltage Vcc. The signal Sb when indicating that the switching of the NMOS transistors 32 and 33 should be stopped is referred to as "signal Sb to stop the switching". Details of the signal Pon will be described later.

In the state setting period, when the level of the voltage Vcc is lower than a predetermined level Vston (e.g., 9 V), the control circuit 81 outputs the signal Pon for causing the charging circuit 82 to charge the capacitor 61. On the other hand, when the level of the voltage Vcc reaches a predetermined level Vstoff (e.g., 10 V), the control circuit 81 outputs the signal Pon for causing the charging circuit 82 to stop charging the capacitor 61.

Further, in response to the level of the voltage Vcc dropping to the predetermined level Vston from the predetermined level Vstoff, the control circuit 81 outputs the signal Pon for causing the charging circuit 82 to charge the capacitor 61 again. Thereafter, upon completion of the state setting period, the control circuit 81 outputs the signal Pon for causing the charging circuit 82 to charge the capacitor 61 until the level of the voltage Vcc reaches the predetermined level Vccon.

Then, in response to the level of the voltage Vcc sufficiently rising and the capacitor 61 starting to be charged with the current from the auxiliary coil L4 by virtue of the completion of the activation of the control IC 50, the control circuit 81 outputs the signal Pon for causing the charging circuit 82 to stop charging the capacitor 61. After the signal Pon for causing the charging circuit 82 to stop charging the capacitor 61 is outputted, the constant voltage source 80 does not need to supply the constant voltage Vstartup, and thus there is substantially no current generation associated with the generation of the constant voltage Vstartup. Thus, there is substantially no power consumption in the constant voltage source 80. The capacitor 61 corresponds to a "first capacitor".

<<Charging Circuit 82>>

The charging circuit 82 operates based on the voltage Vstartup, and charges the capacitor 61 through the terminal VCC, to thereby generate the voltage Vcc. Specifically, in response to the control circuit 81 outputting the signal Pon indicating that the capacitor 61 should be charged, the charging circuit 82 charges the capacitor 61 through the terminal VCC based on the voltage Vstartup. On the other hand, in response to the control circuit 81 outputting the signal Pon indicating that charging of the capacitor 61 should be stopped, the charging circuit 82 stops charging the capacitor 61.

===Current Source 71===

The current source 71 is a circuit that generates, at the terminal STB, a voltage corresponding the state of the interface circuit 18a coupled to the terminal STB. By virtue of the level of the voltage Vstb at the terminal STB, the control IC 50 can operate in an operation mode corresponding to the signal from the microcontroller 15a, and details will be described later. In response to a signal Sa (described later) from the setting circuit 76, the current source 71 according to an embodiment of the present disclosure supplies a current Ia to the terminal STB when the control IC 50 is in a predetermined state. Specifically, in a time period except the state setting period, the current source 71 supplies the current Ia to the terminal STB upon receipt of the signal Sa instructing to supply the current Ia.

The current Ia is a current for charging a capacitor 150 in the interface circuit 18a illustrated in FIG. 9 which will be described later. In response to the microcontroller 15a outputting the signal Wakeup to stop the DC-DC converter 13, the level of the voltage Vstb generated across the capacitor 150 exceeds a predetermined level Vstop (e.g., 5.0 V).

On the other hand, in response to the microcontroller 15a outputting the signal Wakeup to operate the DC-DC converter 13, the capacitor 150 is discharged through a resistor 151 (described later) in FIG. 9. This lowers the level of the voltage Vstb to drop below the predetermined level Vstop. As such, because the level of the voltage Vstb at the terminal STB changes with the current Ia, the control IC 50 can operate in accordance with an instruction from the microcontroller 15a. Details of the interface circuit 18a will be described later.

===Zener Diode 72===
The Zener diode 72 is provided between the terminal STB and the ground, and functions such that the level of the voltage Vstb at the terminal STB does not exceed (i.e., is clamped to) a predetermined level (e.g., 5.9 V). The Zener diode 72 corresponds to a "clamp device".

===Determination Circuit 73===
The determination circuit 73 determines whether the level of the voltage Vstb at the terminal STB exceeds the predetermined level Vstop for determining an operation mode of the control IC 50. Specifically, when the level of the voltage Vstb is lower than the predetermined level Vstop, the determination circuit 73 outputs the signal Sb to perform the switching. The operation mode of the control IC 50 in this case is referred to as "energization mode". When the control IC 50 operates in the "energization mode", the control IC 50 switches the NMOS transistors 32 and 33 after the above-described step (2).

On the other hand, when the level of the voltage Vstb is higher than the predetermined level Vstop, the determination circuit 73 outputs the signal Sb to stop the switching. The operation mode of the control IC 50 in this case is referred to as "interruption mode". When the control IC 50 is in the "interruption mode", the control IC 50 does not switch the NMOS transistors 32 and 33. The "energization mode" corresponds to a "first mode", and the "interruption mode" corresponds to a "second mode". The predetermined level Vstop corresponds to a "first voltage level".

===Resistors 74 and 75===The resistors 74 and 75 generate, from the rectified voltage Vrec1, a voltage Vh to detect an effective value of the AC voltage Vac. Specifically, the resistors 74 and 75 are coupled in series between a node that receives the rectified voltage Vrec1 and the ground, to generate the voltage Vh at the coupling point at which the resistors 74 and 75 are coupled.

Figure 5:
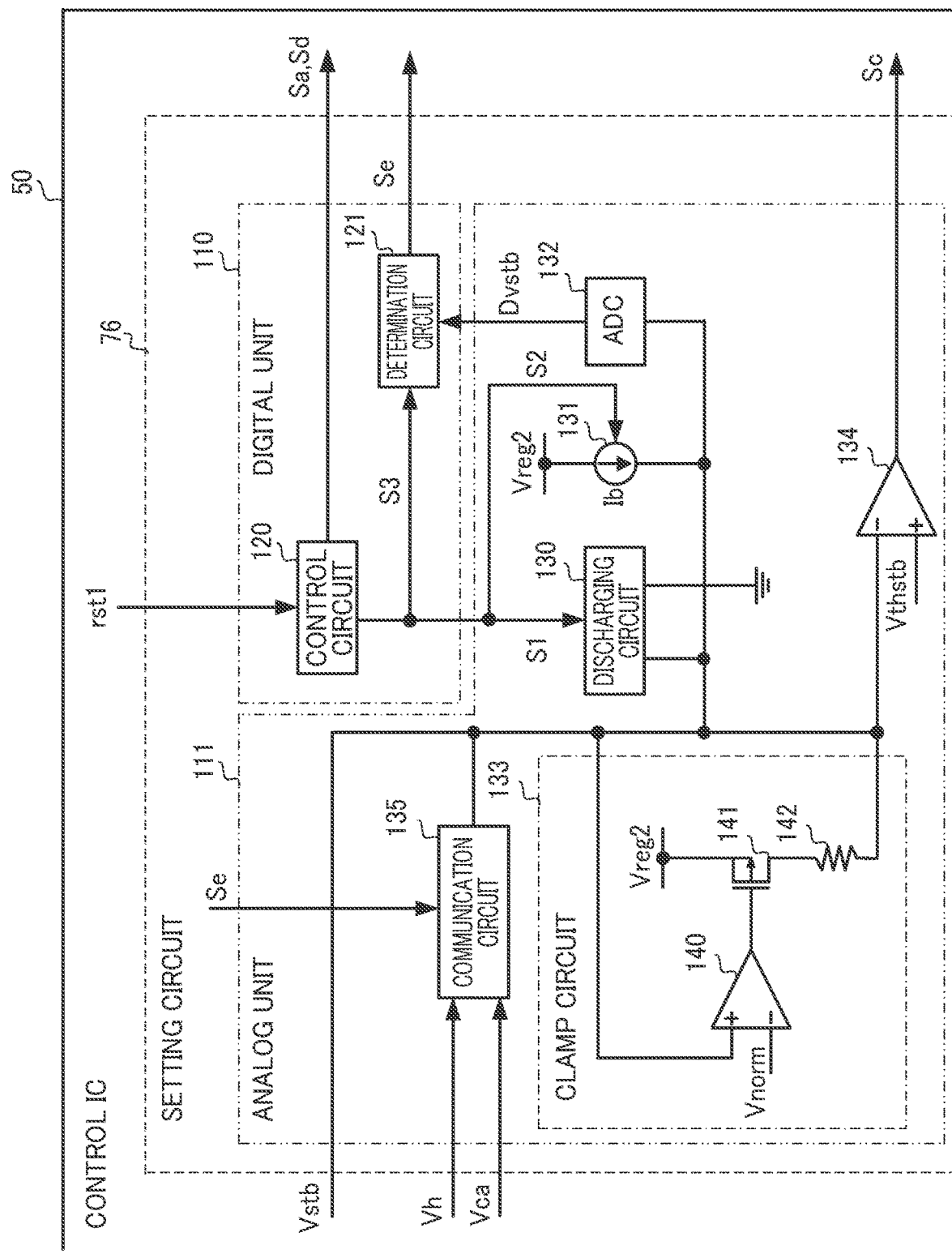
FIG. 5 is a diagram illustrating an example of a setting circuit 76.

===Setting Circuit 76===
FIG. 5 is a diagram illustrating an example of the setting circuit 76. The setting circuit 76 outputs various signals to set the operation of the control IC 50. Specifically, the setting circuit 76 outputs the signal Sa to cause the current source 71 to supply or stop the current Ia.

Additionally, when the driving pattern is changed in an "external mode" (described later), the setting circuit 76 detects a change in the level of the voltage Vstb, to output a signal Sc instructing the driving pattern of the NMOS transistors 32 and 33 to the oscillator circuit 101 (described later). The setting circuit 76 outputs a signal Sd indicating the completion of the state setting period and a signal Se indicating a method of changing the driving pattern of the NMOS transistors 32 and 33. The setting circuit 76 includes: a digital unit 110 configured with a digital circuit (logic circuit); and an analog unit 111 configured with an analog circuit.

===Digital Unit 110===
The digital unit 110 includes a control circuit 120 and a determination circuit 121.

===Control Circuit 120===The control circuit 120 controls the current source 71, the control circuit 81, and the internal power supply 92 in FIG. 4, and various circuits in the analog unit 111 in FIG. 5. The control circuit 120 corresponds to a "control circuit".

===Determination Circuit 121===
The determination circuit 121 determines a method of changing the driving pattern of the NMOS transistors 32 and 33 based on the signal from the control circuit 120 and the conversion result (a digital value Dvstb) of an analog-digital converter (ADC) 132 (described later).

In response to receiving, from the control circuit 120, a signal S3 indicating a timing at which the conversion result should be obtained, the determination circuit 121 acquires the digital value Dvstb, which is obtained by converting a voltage value of the voltage Vstb corresponding a resistance value Rstb of the resistor 151 (described later) into a digital value. According to the digital value Dvstb, the determination circuit 121 outputs the signal Se indicating whether the driving pattern is changed in the "external mode" or the "internal mode".

The "external mode" is a mode in which a comparator 134 described later determines the level of the voltage Vstb that is outputted by the interface circuit 18a according to the logic level of the signal ExtSTB, and the driving pattern is changed depending on whether the level of the voltage Vstb is higher than a predetermined level Vthstb described later.

On the other hand, the "internal mode" is a mode in which the driving pattern is changed based on a voltage Vca outputted by the load detection circuit 100 described later, that is, on the state of the load 14. The determination circuit 121 corresponds to a "second determination circuit".

===Analog Unit 111===
The analog unit 111 is configured with an analog circuit, and includes a discharging circuit 130, a current source 131, the analog-digital converter (ADC) 132, a clamp circuit 133, a comparator 134, and a communication circuit 135. The discharging circuit 130, the current source 131, and the analog-digital converter 132 of the analog unit 111 operate to determine a method of changing the driving pattern of the NMOS transistors 32 and 33 in FIG. 3 based on the resistance value Rstb of the resistor 151 illustrated in FIG. 9 described later, in the state setting period.

===Discharging Circuit 130===
In the state setting period, the discharging circuit 130 discharges the capacitor 150 (described later) in FIG. 9 described later in order to accurately determine a voltage corresponding to the resistance value Rstb of the resistor 151. Specifically, in response to the control circuit 120 outputting the signal S1 to discharge the capacitor 15, the discharging circuit 130 discharges the terminal STB to which the capacitor 150 is coupled. On the other hand, in response to the control circuit 120 outputting the signal S1 to stop to discharge the capacitor 150, the discharging circuit 130 stops discharging the terminal STB to which the capacitor 150 is coupled.

===Current Source 131===

The current source 131 supplies a current Ib to the terminal STB to measure the resistance value Rstb of the resistor 151 in FIG. 9 described later for setting the method of changing the driving pattern. Specifically, in response to receiving, from the control circuit 120, the signal S2 to instruct to supply the current Ib, the current source 131 supplies the current Ib to the resistor 151 through the terminal STB. This makes it possible for the control IC 50 to determine the resistance value Rstb of the resistor 151.

As illustrated in FIG. 6, when the user sets the method of changing the driving pattern to the "external mode", the resistance value Rstb is set to a resistance value Ra, and when the user sets the method of changing the driving pattern to the "internal mode", the resistance value Rstb is set to a resistance value Rb. Details will be described later.

When the resistance value Rstb is the resistance value Ra, the determination circuit 121 outputs the signal Se indicating that the driving pattern is changed in the "external mode". The signal Se when indicating that the driving pattern is changed in the "external mode" is referred to as "signal Se indicating "external mode"".

On the other hand, when the resistance value Rstb is the resistance value Rb, the determination circuit 121 outputs the signal Se indicating that the driving pattern is changed in the "internal mode". The signal Se when indicating that the driving pattern is changed in the "internal mode" is referred to as "signal Se indicating "internal mode"".

===Analog-Digital Converter (ADC) 132===

The analog-digital converter (ADC) 132 converts the voltage value of the voltage Vstb into the digital value Dvstb. In an embodiment of the present disclosure, the control circuit 120 outputs the signal S2 instructing to supply the current Ib, and outputs the signal S3 indicating the timing at which the digital value Dvstb should be obtained. Thereafter, the determination circuit 121 outputs the signal Se based on the digital value Dvstb. In this process, the analog-digital converter 132 converts a voltage value of the voltage generated across the resistor 151 into the digital value Dvstb, and then outputs the digital value Dvstb to the determination circuit 121.

===Clamp Circuit 133===

The clamp circuit 133 generates a voltage so as to clamp the level of the voltage Vstb at the terminal STB to a predetermined level Vnorm.

The clamp circuit 133 includes an operational amplifier 140, a PMOS transistor 141, and a resistor 142. The operational amplifier 140 drives the PMOS transistor 141 to reduce an on-resistance of the PMOS transistor 141, when the level of the voltage Vstb inputted to a non-inverting input terminal thereof is lower than the predetermined level Vnorm inputted to an inverting input terminal thereof.

On the other hand, the operational amplifier 140 drives the PMOS transistor 141 to increase the on-resistance of the PMOS transistor 141, when the level of the voltage Vstb is higher than the predetermined level Vnorm. The resistor 142 then generates a voltage such that the level of the voltage Vstb reaches the predetermined level Vnorm while a current according to the on-resistance of the PMOS transistor 141 and to the voltage Vreg2 are limited.

The driving capability of the clamp circuit 133 that drives the terminal STB is smaller than the driving capabilities of the discharging circuit 130 and the communication circuit 135 (described later). When these circuits do not operate and no ground voltage is applied to the terminal STB from the outside, the clamp circuit 133 generates a voltage such that the level of the voltage Vstb reaches the predetermined level Vnorm.

===Comparator 134===

The comparator 134 determines whether the control IC 50 is operated in the "normal mode" or the "low standby power mode" in response to the signal ExtSTB from the microcontroller 15*a*.

Figure 7:
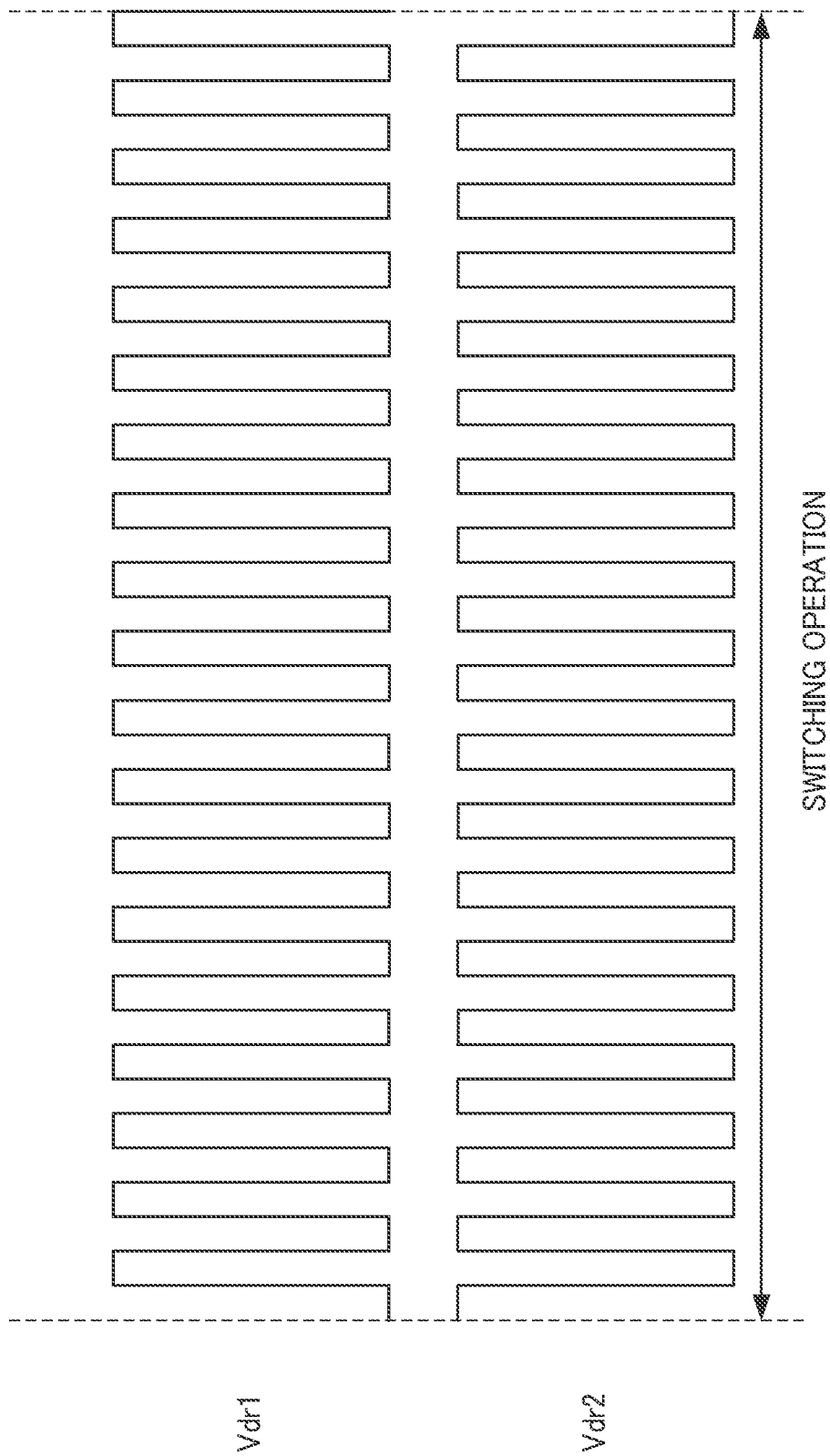
FIG. 7 is a diagram illustrating an example of driving signals Vdr1 and Vdr2 in a "normal mode".

The "normal mode" herein is an operation mode in which the control IC 50 continuously switches the NMOS transistors 32 and 33 as illustrated in FIG. 7 when the state of the load is not a light load.

Figure 8:
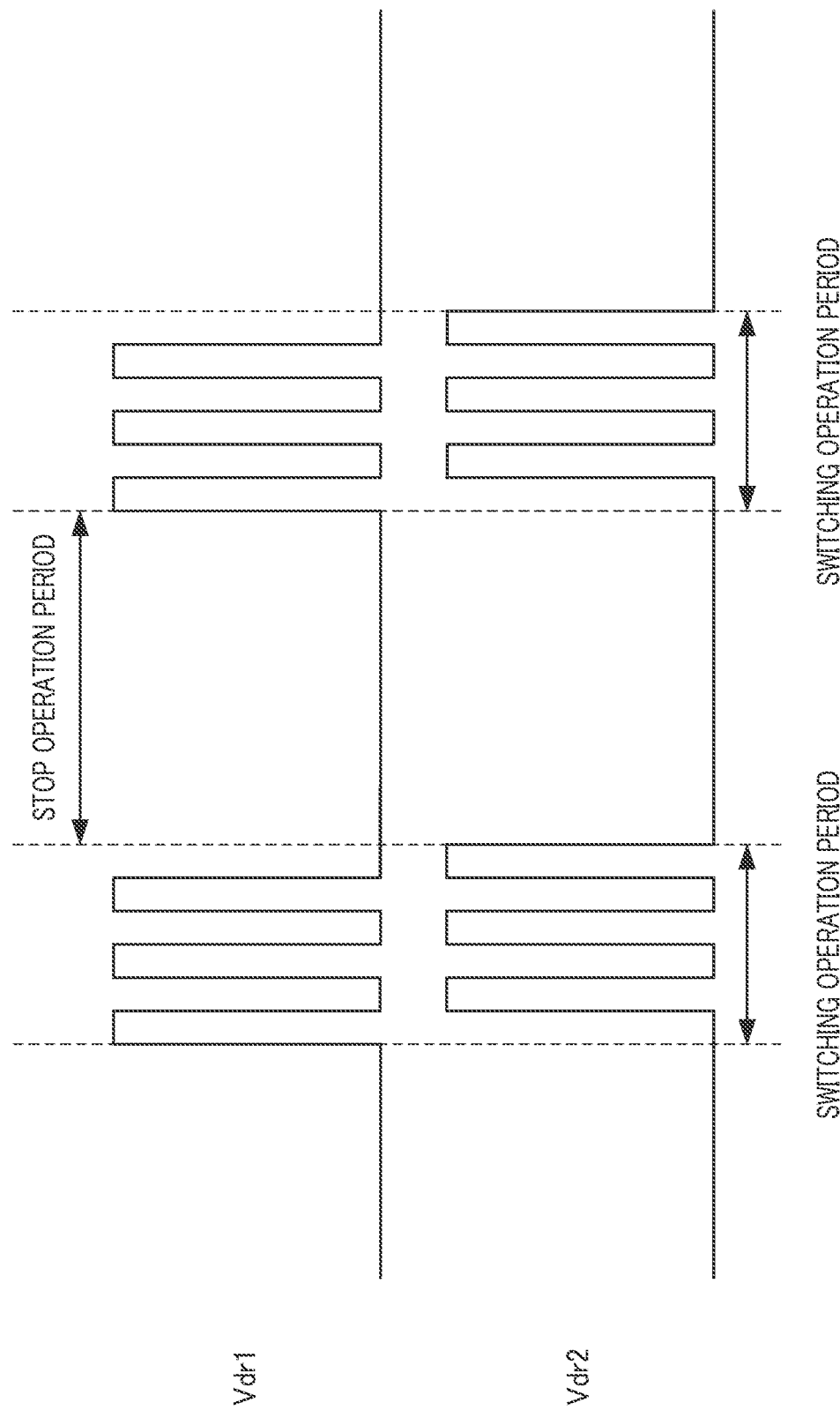
FIG. 8 is a diagram illustrating an example of driving signals Vdr1 and Vdr2 in a "low standby power mode".

On the other hand, the "low standby power mode" is an operation mode in which the control IC 50 alternately repeats the switching operation period in which the NMOS transistors 32 and 33 are continuously switched and the stop operation period in which the switching is intermittently stopped, as illustrated in FIG. 8, in other words, performs the switching in a so-called burst mode, when the state of the load is a light load.

The "normal mode" and the "low standby power mode" indicate the driving patterns of the NMOS transistors 32 and 33 when the control IC 50 operates in the "energization mode".

Specifically, when the signal Se indicating the "external mode" is outputted, and upon detecting the voltage Vstb higher than the predetermined level Vthstb, the comparator 134 outputs the signal Sc instructing to operate in the "normal mode", to thereby cause the oscillator circuit 101 described later to output an oscillator signal Vosc to switch the NMOS transistors 32 and 33 in the "normal mode".

On the other hand, upon detecting the voltage Vstb at a level lower than the predetermined level Vthstb, the comparator 134 outputs the signal Sc instructing to operate in the "low standby power mode", to thereby cause the oscillator circuit 101 to output the oscillator signal Vosc to switch the NMOS transistors 32 and 33 in the "low standby power mode". The comparator 134 corresponds to a "first signal output circuit" or a "second mode determination circuit", and the signal Sc corresponds to a "second signal". The predetermined level Vthstb corresponds to a "second voltage level", and the determination circuit 73 and the comparator 134 correspond to a "mode selection circuit".

===Communication Circuit 135===

The communication circuit 135 outputs a pulse signal to the terminal STB to implement a function of cooperating with the power factor correction IC 175. Specifically, in order to transmit the effective value of the AC voltage Vac to the power factor correction IC 175, the communication circuit 135 receives the voltage Vh for determining the effective value of the AC voltage Vac based on the rectified voltage Vrec1 applied to the terminal VH, and generates the pulse signal based on the voltage Vh and outputs it to the terminal STB. The pulse signal has an amplitude level lower than the predetermined level Vstop and higher than the predetermined level Vthstb.

This operation is executed such that the communication circuit 135 receives the voltage Vh, generates the pulse signal indicating whether the effective value of the AC voltage Vac is high (e.g., 200 V) or low (e.g., 100 V), and outputs the pulse signal to the power factor correction IC 175 through the interface circuit 18*a* (18*b*).

Further, upon receipt of the signal Se indicating the "internal mode", the communication circuit 135 outputs the pulse signal having a pulse width corresponding to the state of the load 14. The communication circuit 135 corresponds to a "second signal output circuit" or a "signal output circuit", and the pulse signal corresponds to a "third signal".

===Reset Circuit (RESET) 90===

Referring back to FIG. 4, the reset circuit (RESET) 90 resets the circuits of the digital unit of the control IC 50 when the voltage Vcc is low, and stops operating the digital circuit of the control IC 50. Specifically, when the level of the voltage Vcc does not reach a predetermined level Vccrst, the reset circuit 90 outputs the signal rst1 to reset the digital circuit of the control IC 50.

On the other hand, in response to the level of the voltage Vcc exceeding the predetermined level Vccrst, the reset circuit 90 outputs the signal rst1 to start operating the digital circuit of the control IC 50. In an embodiment of the present disclosure, in response to the voltage Vcc rising such that the reset circuit 90 cancels the reset of the circuits of the digital unit, the above-described state setting is executed.

===Under Voltage Protection Circuit (UVLO) 91===

When the voltage Vcc is low, the under voltage protection circuit (UVLO) 91 resets the load detection circuit 100, the oscillator circuit 101, and the driver circuit 102 (described later), to thereby stop operating the load detection circuit 100, the oscillator circuit 101, and the driver circuit 102. Specifically, when the level of the voltage Vcc does not reach the predetermined level Vccon, the under voltage protection circuit 91 outputs the signal rst2 to reset the load detection circuit 100, the oscillator circuit 101, and the driver circuit 102.

On the other hand, in response to the level of the voltage Vcc exceeding the predetermined level Vccon, the under voltage protection circuit 91 outputs the signal rst2 to start operating the load detection circuit 100, the oscillator circuit 101, and the driver circuit 102. In an embodiment of the present disclosure, in response to the voltage Vcc rising such that the under voltage protection circuit 91 cancels the reset of the various circuits, the control IC 50 starts the switching operation.

===Internal Power Supply (REG1) 92===

When the control IC 50 is activated, upon rising in the level of the voltage Vcc, the internal power supply (REG1) 92 generates a voltage Vreg1 for the driving signals Vdr1 and Vdr2 that is outputted by the driver circuit 102 (described later). Specifically, in response to the signal Sb to perform the switching being received from the determination circuit 73 and the level of the voltage Vcc rising from the ground level, the internal power supply 92 gradually generates the voltage Vreg1 inside.

Thereafter, in response to receiving, from the setting circuit 76, the signal Sd indicating the completion of the state setting period, the internal power supply 92 outputs the voltage Vreg1 to the terminal REG. When the control IC 50 operates in the "energization mode", in response to receiving the above-described signal rst2 from the under voltage protection circuit 91, the driver circuit 102 starts switching the NMOS transistors 32 and 33.

In response to receiving the signal Sb to stop the switching from the determination circuit 73, the internal power supply 92 stops generating the voltage Vreg1. Thus, when the control IC 50 is in the "interruption mode", the driver circuit 102 stops switching the NMOS transistors 32 and 33. The internal power supply 92 corresponds to a "first power supply voltage generation circuit", and the voltage Vreg1 corresponds to a "first power supply voltage".

===Internal Power Supply (REG2) 93===

When the control IC 50 is activated, the internal power supply (REG2) 93 generates the voltage Vreg2 used as a power supply of the various circuits to execute the state setting, upon rising in the voltage Vcc. Specifically, in response to the signal Sb to perform the switching being received from the determination circuit 73 and the level of the voltage Vcc rising from the ground level, the internal power supply 93 generates the voltage Vreg2. Accordingly, the various circuits (e.g., the control circuit 120, the discharging circuit 130, and the current source 131) of the control IC 50 operate upon receipt of the voltage Vreg2 when the control IC 50 operates in the "energization mode".

Further, in response to the signal Sb to stop the switching being received from the determination circuit 73, the internal power supply 93 stops generating the voltage Vreg2. Accordingly, the various circuits of the control IC 50 do not operate when the control IC 50 is in the "interruption mode". The internal power supply 93 corresponds to a "second power supply voltage generation circuit", and the voltage Vreg2 corresponds to a "second power supply voltage".

===Load Detection Circuit 100===

The load detection circuit 100 detects whether the state of the load 14 is a light load or a heavy load based on a voltage that is applied to the terminal IS and corresponds to the power consumption of the load 14. The load detection circuit 100 outputs the voltage Vca indicating the state of the load 14 to the oscillator circuit 101 and communication circuit 135.

The power consumption of the load 14 when the state of the load 14 is a heavy load is higher than that in a case of a light load. Accordingly, a voltage Vis applied to the terminal IS indicates a voltage corresponding to the power consumption of the load 14, and thus when the voltage Vis is lower than a predetermined value, the load detection circuit 100 outputs the voltage Vca indicating that the state of the load 14 is a light load.

On the other hand, when the voltage Vis is higher than the predetermined value, the load detection circuit 100 outputs the voltage Vca indicating that the state of the load 14 is a heavy load. The heavier the state of the load 14 becomes, the higher the voltage Vca rises. The voltage Vca corresponds to a "first signal".

===Oscillator Circuit 101===

The oscillator circuit 101 is a voltage control oscillator circuit that outputs the oscillator signal Vosc to switch the NMOS transistors 32 and 33 in FIG. 3 based on the inputted feedback voltage Vfb_a.

Further, upon drop in the level of the voltage Vfb_a, the oscillator circuit 101 outputs the oscillator signal Vosc at a high frequency. In response to the state of the load 14 becoming a light load, the output voltage Vout2 exceeds a target level. Accordingly, an internal input to the voltage regulator circuit 43, which is configured with a shunt regulator illustrated in FIG. 3, rises, and thus a large amount of currents is passed through a transistor inside the shunt regulator not illustrated, to make the output constant.

As a result, a large amount of currents also flows through the light-emitting diode 44. The phototransistor 62 then passes the bias current I1 with a magnitude corresponding to the amplification of the light from the light-emitting diode 44, from the terminal FB to the ground, to thereby lower the feedback voltage Vfb_a.

In response to the signal rst2 for causing the oscillator circuit 101 to start operating is outputted by the under voltage protection circuit 91, the oscillator circuit 101 outputs the oscillator signal Vosc for causing the control IC 50 to switch the NMOS transistors 32 and 33 in the "normal mode" or the "low standby power mode" based on the signal Sc or the voltage Vca.

When the signal Se indicating the "external mode" is outputted, the oscillator circuit 101 operates based on a logic level of the signal Sc from the setting circuit 76.

On the other hand, when the signal Se indicating the "internal mode" is outputted, the oscillator circuit 101 operates based on the voltage level of the voltage Vca from the load detection circuit 100.

<<<Change in Driving Pattern in "Internal Mode">>

When the signal Se indicating the "internal mode" is outputted, the oscillator circuit 101 switches the NMOS transistors 32 and 33 in the "normal mode", upon receipt of the voltage Vca higher than a predetermined level Vcastb from the load detection circuit 100.

On the other hand, the oscillator circuit 101 switches the NMOS transistors 32 and 33 in the "low standby power mode", upon receipt of the voltage Vca lower than the predetermined level Vcastb from the load detection circuit 100.

The oscillator circuit 101 corresponds to an "oscillator circuit", the "normal mode" corresponds to a "third mode", the "low standby power mode" corresponds to a "fourth mode", and the oscillator signal Vosc corresponds to a "driving signal".

===Driver Circuit 102===

The driver circuit 102 is supplied with the voltage Vreg1 and drives to switch the NMOS transistors 32 and 33 at a frequency of the oscillator signal Vosc. Specifically, the driver circuit 102 has a frequency of the oscillator signal Vosc, and outputs the pulsed driving signals Vdr1 and Vdr2 having a duty cycle that is constant (e.g., 50%) in principle to the NMOS transistors 32 and 33, respectively, as illustrated in FIGS. 7 and 8. In order to prevent the NMOS transistors 32 and 33 from being turned on concurrently, the driver circuit 102 changes the driving signal Vdr1 and the driving signal Vdr2 in a complementary manner with a dead time being set.

During the operation in the "normal mode", in response to the level of the output voltage Vout2 exceeding the target level, the feedback voltage Vfb_a drops, and thus the frequency of the oscillator signal Vosc increases. As a result, the output voltage Vout2 of the DC-DC converter 13 that is an LLC current resonant power supply circuit drops.

On the other hand, in response to the level of the output voltage Vout2 dropping below the target level, the feedback voltage Vfb_a rises, and thus the frequency of the oscillator signal Vosc decreases. As a result, the output voltage Vout2 of the DC-DC converter 13 rises. Accordingly, during the operation in the "normal mode", the DC-DC converter 13 can generate the output voltage Vout2 at the target level.

<<<Configuration and Operation of Interface Circuit 18a>>>

FIG. 9 is a diagram illustrating an example of the interface circuit 18a. As described above, the interface circuit 18a changes the operation of the control IC 50 and implements the cooperation function between the control IC 50 and the power factor correction IC 175, in response to the signal Wakeup and the signal ExtSTB from the microcontroller 15a in FIG. 1.

The interface circuit 18a includes capacitors 150, 154, 159, and 162, resistors 151, 155, 156, 158, and 161, and NMOS transistors 152, 153, 157, and 160.

The capacitors 150 and 154, the resistors 151, 155, and 156, and the NMOS transistors 152, 153, and 157 set the level of the voltage Vstb at the terminal STB of the control IC 50, and details will be described later. On the other hand, the resistors 158 and 161, the capacitors 159 and 162, and the NMOS transistor 160 implement the cooperation function between the control IC 50 and the power factor correction IC 175.

===Circuit for Setting Level of Voltage Vstb at Terminal STB===

<Configuration of Circuit Related to Signal Wakeup>

The capacitor 150 is provided between a signal line L1 coupled to the terminal STB of the control IC 50 and the ground, to be charged with the current Ia from the current source 71 of the control IC 50. The capacitor 150 corresponds to a "second capacitor", and the signal line L1 corresponds to a "first signal line".

The resistor 151 has the resistance value Rstb, and has one end coupled to the signal line L1 and the other end coupled to the ground through the NMOS transistor 152. As described above, the resistance value Rstb is set for the control IC 50 to determine whether the driving pattern is in the "external mode" or the "internal mode".

The NMOS transistor 152 is a switch to be turned on and off in response to the signal Wakeup received from the microcontroller 15a in FIG. 1 at a gate electrode thereof. The NMOS transistor 152 is coupled in series with the resistor 151.

==Operation when Signal Wakeup is at Low Level (Hereinafter, Referred to as Low or Low Level)==

Figure 10:
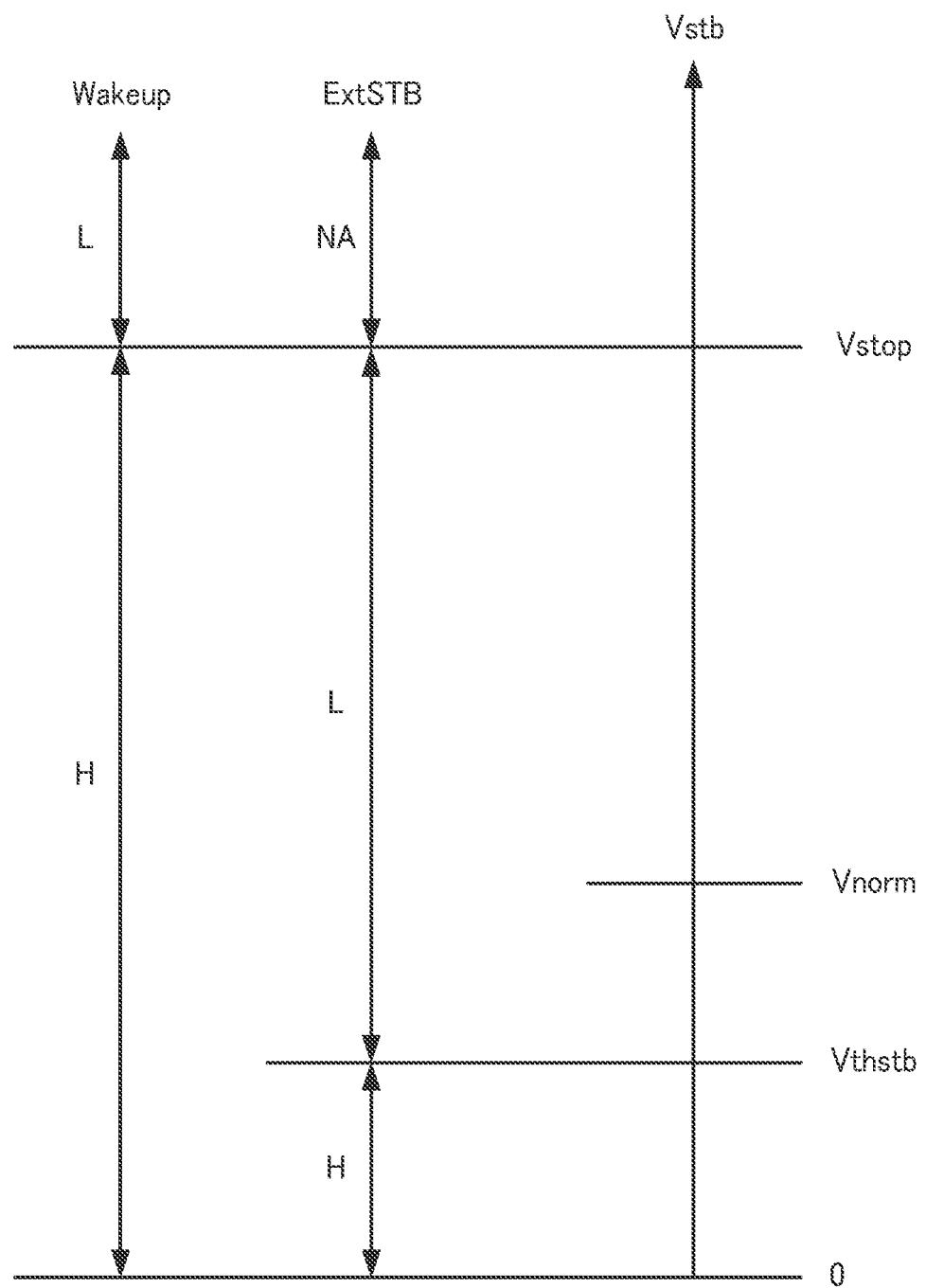
FIG. 10 is a diagram illustrating a relationship between logic levels of a signal Wakeup and a signal ExtSTB and a voltage Vstb.

Upon receipt of the low signal Wakeup to stop the DC-DC converter 13, the NMOS transistor 152 is turned off to thereby disconnect the resistor 151 from the ground. In this case, since the capacitor 150 is not discharged through the resistor 151, the capacitor 150 is charged with the current Ia from the current source 71, and the level of the voltage Vstb exceeds the predetermined level Vstop as illustrated in FIG. 10. As a result, the determination circuit 73 determines that the control IC 50 should be set to the "interruption mode".

In other words, the interface circuit 18a sets the control IC 50 to the "interruption mode" as indicated in a row in which the signal Wakeup is low in FIG. 11. When the signal Wakeup is low, the NMOS transistor 153 described later is disconnected from the ground, and thus the level of the voltage Vstb is not affected by the signal ExtSTB.

==Operation when Signal Wakeup is at High Level (Hereinafter, Referred to as High or High level)==

On the other hand, upon receipt of the signal Wakeup to operate the DC-DC converter 13 (e.g., at the high level), the NMOS transistor 152 is turned on, to connect to the ground the resistor 151, which is coupled in series with the NMOS transistor 152. This causes the capacitor 150 to be discharged through the resistor 151, such that the level of the voltage Vstb drops below the predetermined level Vstop as illustrated in FIG. 10. As a result, the determination circuit 73 determines that the control IC 50 should be set to the "energization mode".

Accordingly, the control IC 50 operates in the "energization mode" as indicated in rows in which the signal Wakeup is high in FIG. 11. The resistor 151 corresponds to a "resistor", the NMOS transistor 152 corresponds to a "first switch", and the signal Wakeup corresponds to an "instruction signal". The current source 71 corresponds to a "current source".

When the control IC 50 is in the state setting period when the control IC 50 is activated, the current Ib from the current source 131 that receives the signal S2 instructing to supply the current Ib flows through the resistor 151, thereby generating a predetermined voltage at the terminal STB as the voltage Vstb. As a result, the analog-digital converter 132 converts this predetermined voltage into the digital value Dvstb.

Thereafter, according to the digital value Dvstb, the determination circuit 121 outputs the signal Se indicating whether the driving pattern should be changed in the "external mode" or the "internal mode". Specifically, when the resistance value Rstb of the resistor 151 is the resistance value Ra, the determination circuit 121 outputs the signal Se indicating the "external mode" as illustrated in FIG. 6.

On the other hand, when the resistance value Rstb of the resistor 151 is the resistance value Rb, the determination circuit 121 outputs the signal Se indicating the "internal mode" as illustrated in FIG. 6.

<Configuration of Circuit Related to Signal ExtSTB>

The NMOS transistor 153 is a switch to change the level of the voltage Vstb in response to the signal ExtSTB, and is provided between the NMOS transistor 157 (described later) and the NMOS transistor 152. The NMOS transistor 153 receives the signal ExtSTB from the microcontroller 15a at a gate electrode thereof.

Before describing what level of the voltage Vstb is outputted by the interface circuit 18a depending on a logic level of the signal ExtSTB, a relationship between the terminal REG and the NMOS transistor 157 described later will be described below.

<Configuration of Circuit Related to Terminal REG>

The capacitor 154 is provided between the terminal REG and the ground, to stabilize the output voltage Vreg1 of the internal power supply 92.

The resistors 155 and 156 divide the voltage Vreg1, to generate a voltage Vreg1_div at the coupling point at which the resistors 155 and 156 are coupled.

The NMOS transistor 157 receives the gate electrode voltage Vreg1_div, and is provided between the signal line L1 and the NMOS transistor 153, and is coupled to the ground through the NMOS transistors 152 and 153. The NMOS transistors 153 and 157 are coupled in parallel with the resistor 151.

The internal power supply 92 then stops outputting the voltage Vreg1 until the state setting period of the control IC 50 is completed, and thus the NMOS transistor 157 is off. Thus, the NMOS transistor 157 eliminates the effect on the level of the voltage Vstb caused by the NMOS transistor 153 that receives the signal ExtSTB. The NMOS transistor 157 corresponds to a "second switch", and the NMOS transistor 153 corresponds to a "third switch".

Specifically, the internal power supply 92 outputs the voltage Vreg1 that is a ground voltage until the state setting period of the control IC 50 is completed, and thus the NMOS transistor 157 is off, to thereby eliminate the effect of the NMOS transistor 153 during the state setting period.

Thereafter, upon the completion of the state setting period of the control IC 50, the internal power supply 92 outputs the voltage Vreg1, and the NMOS transistor 157 is turned on. Once the NMOS transistor 157 is turned on, the level of the voltage Vstb changes in response to turning on and off of the NMOS transistor 153 since the NMOS transistor 152 is on, and the control IC 50 changes the operation mode in response to the signal ExtSTB.

Upon receipt of the signal ExtSTB instructing the driving pattern of the NMOS transistors 32 and 33 in FIG. 3, the NMOS transistor 153 is turned on or off, to set the voltage Vstb to be lower or higher than the voltage Vthstb as illustrated in FIG. 10.

When the signal Wakeup is low, and the control IC 50 is in the "interruption mode", the NMOS transistor 153 is disconnected from the ground, and thus the level of the voltage Vstb is not affected by the signal ExtSTB. Accordingly, the following will describes what level of the voltage Vstb is outputted by the interface circuit 18a in response to the signal ExtSTB, when the control IC 50 is in the "energization mode" due to the signal Wakeup being high.

==Operation when Signal ExtSTB is High==

Specifically, upon receipt of the signal ExtSTB to switch the NMOS transistors 32 and 33 in the "low standby power mode" (i.e., at the high level), the NMOS transistor 153 is turned on. In this process, irrespective of the operation of the clamp circuit 133 in FIG. 5, the level of the voltage Vstb drops below the predetermined level Vthstb as illustrated in FIG. 10.

In this process, the comparator 134 outputs the signal Sc instructing to set the "low standby power mode", to thereby cause the oscillator circuit 101 to output the oscillator signal Vosc to switch the NMOS transistors 32 and 33 in the "low standby power mode".

As a result, the interface circuit 18a causes the control IC 50 to intermittently switch the NMOS transistors 32 and 33 as indicated in the row in which the signal ExtSTB is high in FIG. 11.

==Operation when Signal ExtSTB is Low==

On the other hand, upon receipt of the signal ExtSTB to switch the NMOS transistors 32 and 33 in the "normal mode" (i.e., at the low level), the NMOS transistor 153 is turned off. In this process, the level of the voltage Vstb exceeds the predetermined level Vthstb as illustrated in FIG. 10.

In this process, the comparator 134 outputs the signal Sc instructing to set the "normal mode", to thereby cause the oscillator circuit 101 to output the oscillator signal Vosc to switch the NMOS transistors 32 and 33 in the "normal mode".

As a result, the interface circuit 18a causes the control IC 50 to continuously switch the NMOS transistors 32 and 33 as indicated in the row in which the signal ExtSTB is low in FIG. 11. The cooperation function of the interface circuit 18a will be described later.

==Circuit on Power Factor Correction IC 175 Side==

As described above, the resistors 158 and 161, the capacitors 159 and 162, and the NMOS transistor 160 implement the cooperation function between the control IC 50 and the power factor correction IC 175.

The resistor 158 and the capacitor 159 configure a low-pass filter that removes noise of the pulse signal outputted by the communication circuit 135 in FIG. 5. The pulse signal is formed such that two pulses with a period T1 are outputted when the effective value of the AC voltage Vac is 100 V, and one pulse with the period T1 is outputted when the effective value of the AC voltage Vac is 200 V.

The NMOS transistor 160 is turned on and off in response to the output of the low-pass filter, to output to the power factor correction IC 175 the voltage Sig corresponding to the pulse signal outputted by the communication circuit 135.

The resistor 161 is provided between the terminal RT and the ground, and lowers the voltage at the terminal RT in response to turning off of the NMOS transistor 160.

The capacitor 162 is provided between the terminal RT and the ground, to stabilize the voltage at the terminal RT.

<<<Overview of Power Factor Correction Circuit 22>>>

Figure 12:
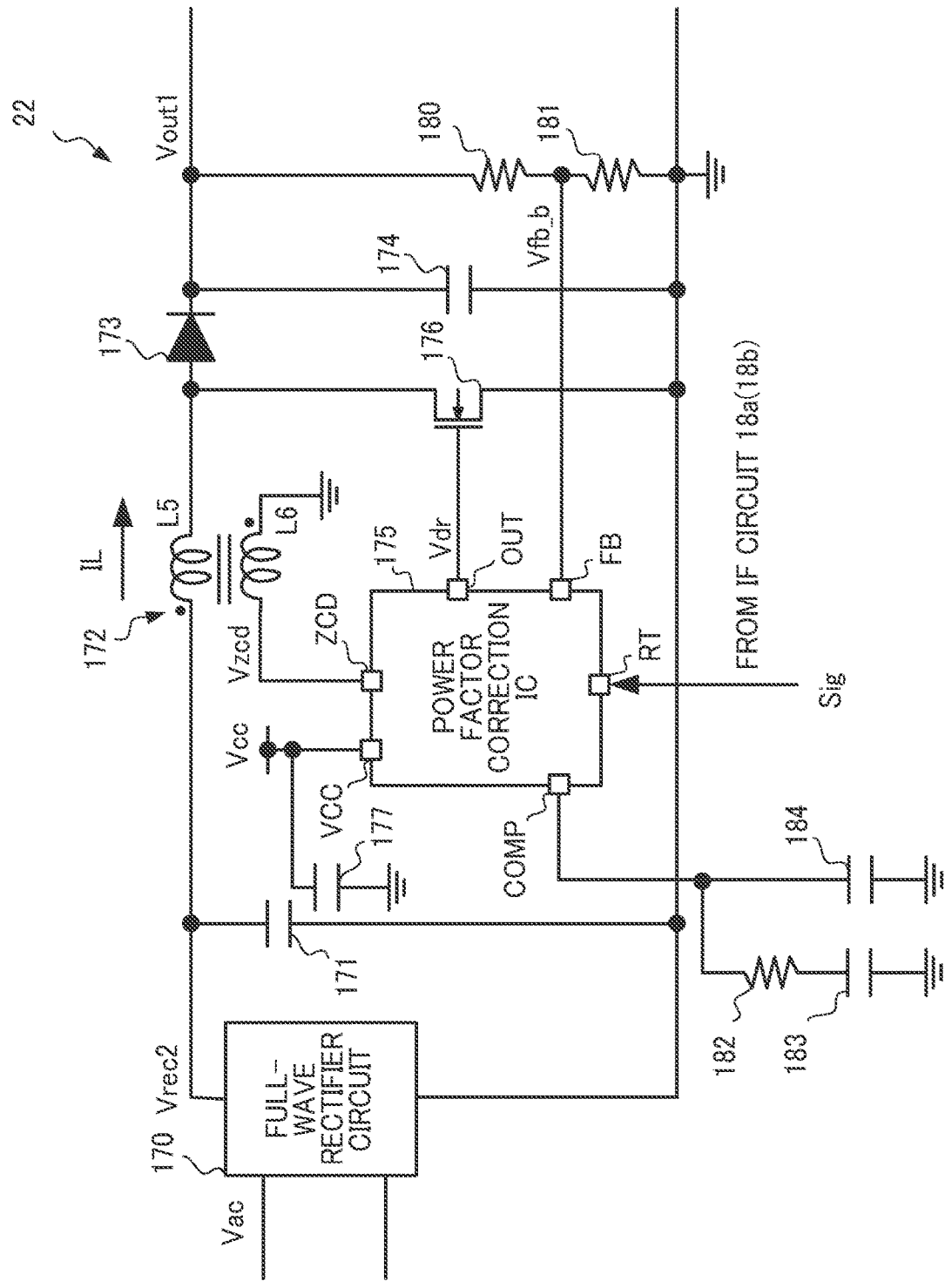
FIG. 12 is a diagram illustrating an example of a power factor correction circuit 22.

FIG. 12 is a diagram illustrating a configuration of the power factor correction circuit 22. The power factor correction circuit 22 is a step-up chopper power supply circuit that generates the output voltage Vout1 at a target level from the AC voltage Vac of the commercial power supply.

The power factor correction circuit 22 includes a full-wave rectifier circuit 170, capacitors 171, 174, 183, and 184, a transformer 172, a diode 173, the power factor correction IC 175, an NMOS transistor 176, and resistors 180 to 182.

The full-wave rectifier circuit 170 applies the rectified voltage Vrec2, which is obtained by full-wave rectifying the predetermined AC voltage Vac applied thereto, to the capacitor 171 and a main coil L5 of the transformer 172. Here, for example, the AC voltage Vac is a voltage of 100 to 240 V with the frequency of 50 to 60 Hz.

The capacitor 171 is an element that smooths the rectified voltage Vrec2, and the transformer 172 includes the main coil L5 and an auxiliary coil L6 magnetically coupled to the main coil L5. In an embodiment of the present disclosure, the auxiliary coil L6 is wound such that a voltage generated across the auxiliary coil L6 is opposite in polarity to a voltage generated across the main coil L5. A voltage Vzcd generated across the auxiliary coil L6 is applied to a terminal ZCD.

The rectified voltage Vrec2 is directly applied to the main coil L5; however, for example, the rectified voltage Vrec2 may be applied to the main coil L5 through an element such as a resistor (not illustrated).

The main coil L5 configures a step-up chopper circuit with the diode 173, the capacitor 174, and the NMOS transistor 176. Thus, a charge voltage of the capacitor 174 is the DC output voltage Vout1. The output voltage Vout1 is, for example, 400 V.

The power factor correction IC 175 is an integrated circuit that controls switching of the NMOS transistor 176 such that the level of the output voltage Vout1 reaches a target level (e.g., 400 V) while correcting the power factor of the AC-DC converter 12. Specifically, the power factor correction IC 175 drives the NMOS transistor 176 based on an inductor current IL flowing through the main coil L5 and the output voltage Vout1.

The power factor correction IC 175 has terminals VCC, RT, FB, ZCD, COMP, and OUT, and details of the power factor correction IC 175 will be described later. The power factor correction IC 175 also has terminals other than the above-described six terminals VCC, RT, FB, ZCD, COMP, and OUT, however, they are omitted herein for the sake of convenience.

The NMOS transistor 176 is a transistor to control power to the DC-DC converter 13 of the AC-DC converter 12. In an embodiment of the present disclosure, the NMOS transistor 176 is a metal oxide semiconductor (MOS) transistor, however, it is not limited thereto. As long as it is a transistor capable of controlling power, the NMOS transistor 176 may be a bipolar transistor, for example. A gate electrode of the NMOS transistor 176 is coupled such that the NMOS transistor 176 is driven by a signal from the terminal OUT.

The resistors 180 and 181 configure a voltage divider circuit that divides the output voltage Vout1, to generate a feedback voltage Vfb_b used when switching the NMOS transistor 176. The feedback voltage Vfb_b generated at a node at which the resistors 180 and 181 are coupled is applied to the terminal FB.

The resistor 182 and the capacitors 183 and 184 are elements for the phase compensation of the power factor correction IC 175 that is feedback-controlled, and details will be described later. The resistor 182 and the capacitor 183 are provided in series between the terminal COMP and the ground, and the capacitor 184 is provided in parallel therewith.

The pulse signal from the interface circuit 18a is inputted to the terminal RT.

<<<Details of Power Factor Correction IC 175>>>

Figure 13:
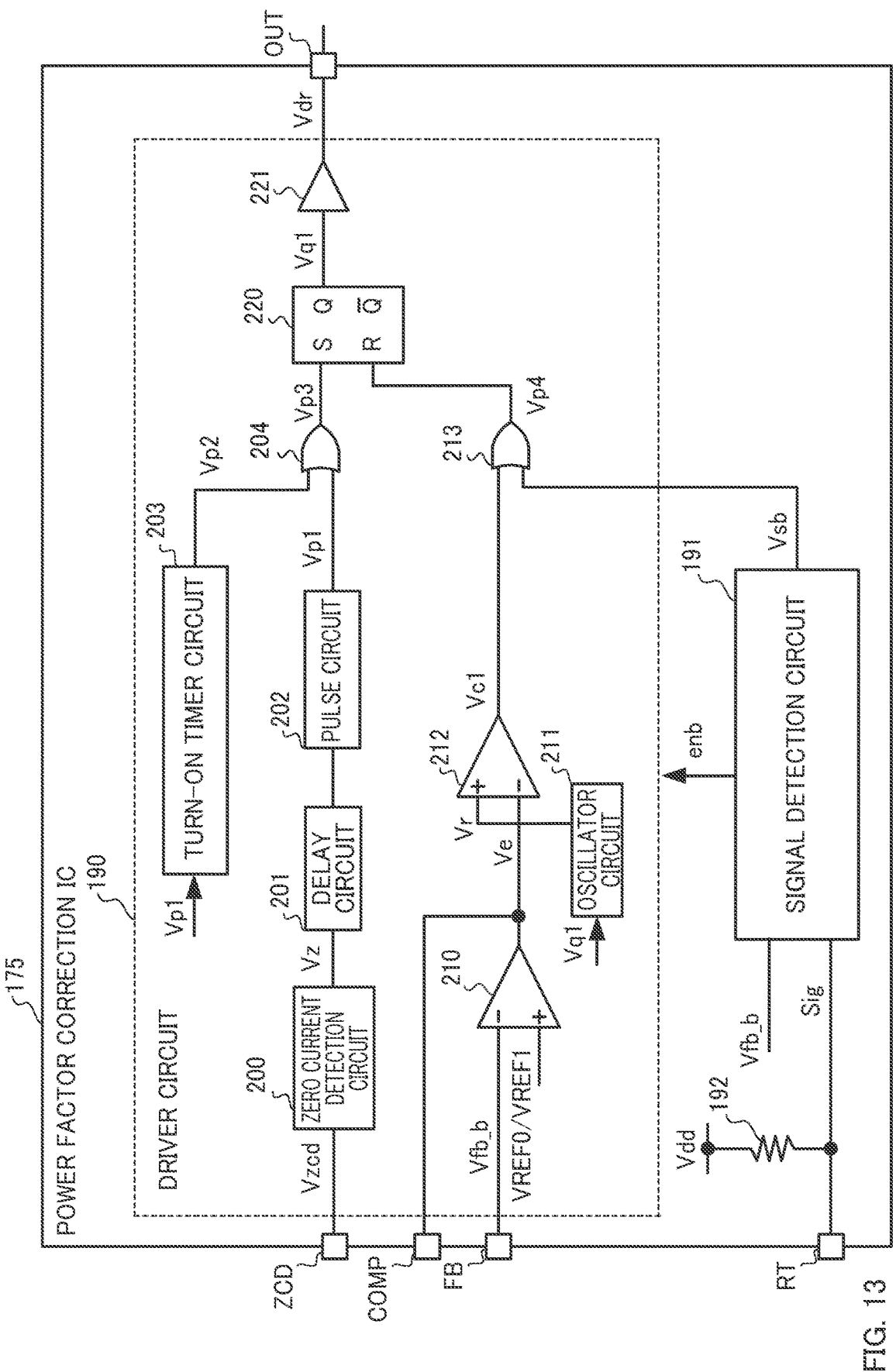
FIG. 13 is a diagram illustrating an example of a power factor correction IC 175.

FIG. 13 is a diagram illustrating an example of a configuration of the power factor correction IC 175. The power factor correction IC 175 includes a driver circuit 190, a signal detection circuit 191, and a resistor 192. In FIG. 13, for the sake of convenience, terminals are illustrated at positions different from those in FIG. 12. However, wiring, elements, and the like coupled to the terminals are the same between FIGS. 12 and 13.

===Driver Circuit 190===

The driver circuit 190 generates a driving signal Vdr to turn on and off the NMOS transistor 176 based on the feedback voltage Vfb_b corresponding to the output voltage Vout1. The driver circuit 190 includes a zero current detection circuit 200, a delay circuit 201, a pulse circuit 202, a turn-on timer circuit 203, OR circuits 204 and 213, an error amplifier circuit 210, an oscillator circuit 211, a comparator 212, an SR flip-flop 220, and a buffer circuit 221.

===Zero Current Detection Circuit 200===

The zero current detection circuit 200 detects whether the current value of the inductor current IL is the "current value Ia" indicating substantially zero (hereinafter, for the sake of convenience, "substantially zero" is simply referred to as zero) based on the voltage Vzcd at the terminal ZCD. Upon detecting that the current value of the inductor current IL is the "current value Ia", which is "zero", the zero current detection circuit 200 according to an embodiment of the present disclosure outputs a high signal Vz. The zero current detection circuit 200 includes a comparator (not illustrated) that compares a predetermined voltage of the auxiliary coil L6 when the inductor current IL is the "current value Ia" with the voltage Vzcd.

===Delay Circuit 201===

Upon receiving the high signal Vz is from the zero current detection circuit 200, the delay circuit 201 delays the received signal for a predetermined time period, and outputs the resultant signal.

===Pulse Circuit 202===

Upon receiving the high signal Vz from the delay circuit 201, the pulse circuit 202 outputs a high pulse signal Vp1.

===Turn-On Timer Circuit 203===

When the power factor correction IC 175 is activated or the AC voltage Vac is interrupted such that the pulse signal Vp1 is not outputted, the turn-on timer circuit 203 outputs a pulse signal Vp2 to turn on the NMOS transistor 176. Specifically, when the pulse signal Vp1 is not outputted for a predetermined time period, the high pulse signal Vp2 is outputted every predetermined cycle.

===OR Circuit 204===

The OR circuit 204 computes the logical OR of the pulse signals Vp1 and Vp2, to output the logical OR. Thus, in an embodiment of the present disclosure, the OR circuit 204 outputs the pulse signal Vp1 or the pulse signal Vp2 as a signal Vp3.

===Error Amplifier Circuit 210===

The error amplifier circuit 210 amplifies an error between the feedback voltage Vfb_b applied to the terminal FB and a predetermined reference voltage VREF0 or VREF1. A ratio between the resistors 180 and 181 is adjusted based on the reference voltage VREF0 such that the output voltage Vout1 is a desired voltage.

The reference voltages VREF0 and VREF1 are selected based on a signal enb from the signal detection circuit 191 described later. The reference voltage VREF1 is a reference voltage when the output voltage Vout1 at a predetermined level lower than a target level is generated when the AC input is high (e.g., 200 V).

The resistor 182 and the capacitors 183 and 184 for the phase compensation are coupled between the output of the error amplifier circuit 210 and the ground through the terminal COMP. A voltage at a node at which the output of the error amplifier circuit 210 and the terminal COMP is coupled is referred to as voltage Ve.

====Oscillator Circuit 211====

The oscillator circuit 211 outputs a ramp wave Vr with an amplitude that gradually increases every time the high signal Vq1 is received from the SR flip-flop 220.

====Comparator 212====

The comparator 212 compares the magnitudes between the voltage Ve and the ramp wave Vr, to output a signal Vc1 as a comparison result. The comparator 212 has an inverting input terminal to receive the voltage Ve, and a non-inverting input terminal to receive the ramp wave Vr. Thus, when the level of the ramp wave Vr is lower than the level of the voltage Ve, the signal Vc1 is low, and when the level of the ramp wave Vr is higher than the level of the voltage Ve, the signal Vc1 is high.

===OR Circuit 213===

The OR circuit 213 computes the logical OR of the signal Vc1 and a signal Vsb from the signal detection circuit 191, to output the logical OR. Thus, in response to the signal Vc1 or the signal Vsb going high, the OR circuit 213 outputs a high signal Vp4.

===SR Flip-Flop 220===

The signal Vp3 is inputted to an S-input of the SR flip-flop 220, and the signal Vp4 is inputted to an R-input thereof. Thus, in response to the signal Vp3 going high, a driving signal Vq1, which is a Q-output of the SR flip-flop 220 goes high. On the other hand, in response to the signal Vp4 going high, the driving signal Vq1 goes low. The SR flip-flop 220 operates while giving priority on reset, and when the signal Vp4 is high, the low signal Vq1 is constantly outputted irrespective of the signal Vp3.

====Buffer Circuit 221====

The buffer circuit 221 drives the NMOS transistor 176 in response to the driving signal Vq1. Specifically, the buffer circuit 221 drives the NMOS transistor 176 with a large gate capacitance and the like in response to the signal Vdr at the same logic level as that of the received signal. The buffer circuit 221 turns on the NMOS transistor 176 in response to the high driving signal Vq1, and turns off the NMOS transistor 176 in response to the low driving signal Vq1.

===Signal Detection Circuit 191===

The signal detection circuit 191 implements a main function when the control IC 50 operates in the "internal mode" and the control IC 50 controls the power factor correction IC 175. An embodiment of the present disclosure is to describe a case where the control IC 50 operates in the "external mode".

Accordingly, in an embodiment of the present disclosure, upon receipt of the signal Se indicating the "external mode" from the determination circuit 121, the communication circuit 135 in FIG. 5 outputs, to the power factor correction IC 175 through the interface circuit 18a, a pulse signal indicating whether the effective value of the AC voltage Vac is high (e.g., 200 V) or low (e.g., 100 V).

The signal detection circuit 191 then detects whether the AC input is 100 V or 200 V in response to the pulse signal inputted through the terminal RT, to output the signal enb indicating whether the AC input is 100 V or 200 V. The resistor 192 for the pull-up to the power supply voltage Vdd from an internal power supply (not illustrated) is coupled to the terminal RT. Other functions of the signal detection circuit 191 will be described later.

<<<Operation of Control IC 50>>>

Figure 14:
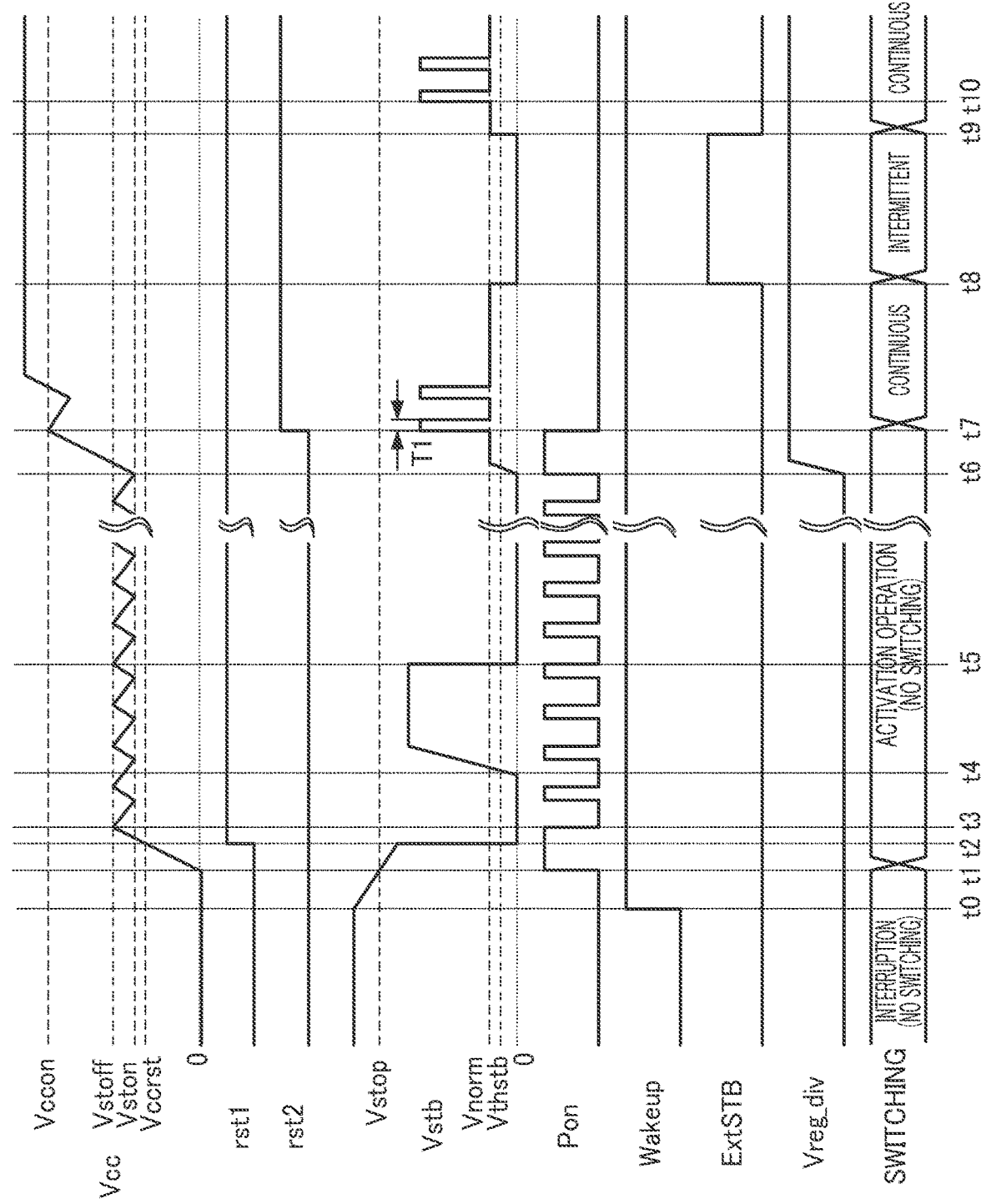
FIG. 14 is a diagram illustrating an example of an operation of a control IC 50.

FIG. 14 is a diagram illustrating an example of an operation of the control IC 50. FIG. 14 is an example of the operation of the control IC 50 in a case where the control IC 50 changes the driving pattern in the "external mode" after the activation of the control IC 50. It is assumed that, before time t0, the microcontroller 15a outputs the signal Wakeup to stop the DC-DC converter 13 (i.e., at the low level). In this process, the control IC 50 is in the "interruption mode". It is also assumed that the effective value of the AC voltage Vac (i.e., the AC input) is 100 V.

At time to, in response to the microcontroller 15a in FIG. 1 outputting the signal Wakeup to operate the DC-DC converter 13 (i.e., at the high level), the NMOS transistor 152 in FIG. 9 is turned on. The capacitor 150 is discharged through the resistor 151, and the voltage Vstb at the terminal STB starts to drop.

At time t1, in response to the voltage Vstb dropping to the predetermined level Vstop, the determination circuit 73 outputs the signal Sb to perform the switching. Accordingly, the control circuit 81 outputs the signal Pon for the charging circuit 82 to start charging the capacitor 61 in FIG. 3. The voltage Vcc then starts rising. In this process, the control IC 50 shifts to the "energization mode". However, since the initial setting of the control IC 50 is not completed yet, the NMOS transistors 32 and 33 are not switched.

At time t2, in response to the voltage Vcc reaching the predetermined level Vccrst, the reset circuit 90 outputs the signal rst1 for the various circuits of the control IC 50 to start operating. The state setting period then starts, and the control circuit 120 in FIG. 5 outputs the signal S1 to discharge the capacitor 150, such that the discharging circuit 130 discharges the capacitor 150. As a result, the voltage Vstb reaches the ground voltage.

At time t3, in response to the voltage Vcc reaching the predetermined level Vstoff, the control circuit 81 outputs the signal Pon for the charging circuit 82 to stop charging the capacitor 61. Thereafter, until time t6 described later, the control circuit 81 outputs the signal Pon for the charging circuit 82 to start charging the capacitor 61 in FIG. 3 in response to the voltage Vcc reaching the predetermined level Vston, and to stop charging it in response to the voltage Vcc reaching the predetermined level Vstoff.

At time t4, in response to the control circuit 120 outputting the signal S1 to stop discharging the capacitor 150, and outputting the signal S2 instructing to supply the current Ib, the current source 131 in FIG. 5 supplies the current Ib to the resistor 151 through the terminal STB. Accordingly, the voltage Vstb results in a voltage corresponding to the resistance value Rstb of the resistor 151. It is assumed in an embodiment of the present disclosure that the resistance value Rstb of the resistor 151 is the resistance value Ra illustrated in FIG. 6.

At time t5, in response to the control circuit 120 outputs the signal S3 indicating the timing at which the digital value Dvstb should be acquired, the determination circuit 121 acquires the digital value Dvstb of the voltage Vstb. As a result, the determination circuit 121 determines that the driving pattern is changed in the "external mode", and outputs the signal Se indicating the "external mode".

Thereafter, the control circuit 120 outputs the signal S1 to discharge the capacitor 150, and the discharging circuit 130 discharges the capacitor 150. As a result, the voltage Vstb reaches the ground voltage.

At time t6 at which the state setting period is completed, in response to the control circuit 120 outputting the signal Sd for indicating the completion of the state setting period in which the various circuits of the control IC 50 are initially set, the control circuit 81 causes the charging circuit 82 to charge the capacitor 61 until the voltage Vcc reaches the predetermined level Vccon. Further, the internal power supply 92 outputs the voltage Vreg1 to the terminal REG.

Upon receipt of the signal S1 to stop discharging the capacitor 150 from the control circuit 120, the discharging circuit 130 stops discharging the capacitor 150. Accordingly, the clamp circuit 133 starts clamping the voltage Vstb to the voltage Vnorm.

At time t7, in response to the voltage Vcc exceeding the predetermined level Vccon, the under voltage protection circuit 91 outputs the signal rst2 to start operating the load detection circuit 100, the oscillator circuit 101, and the driver circuit 102 in FIG. 4. Since the voltage Vcc reaches the predetermined level Vccon, the control circuit 81 outputs the signal Pon for the charging circuit 82 to stop charging the capacitor 61.

Upon receipt of the signal Sc instructing to set the "normal mode" and the signal Se indicating the "external mode", the oscillator circuit 101 outputs the oscillator signal Vosc for the driver circuit 102 to continuously switch the NMOS transistors 32 and 33.

The control IC 50 then starts switching the NMOS transistors 32 and 33 in FIG. 3, and thereafter, the capacitor 61 is charged with the current from the auxiliary coil L4. Since the AC input is 100 V, the communication circuit 135 outputs the pulse signal indicating that the effective value of the AC voltage Vac is low to the power factor correction IC 175 through the terminal STB.

At time t8, in response to the microcontroller 15*a* outputting the signal ExtSTB for the control IC 50 to switch the NMOS transistors 32 and 33 in the "low standby power mode" (i.e., at the high level), the level of the voltage Vstb drops below the predetermined level Vthstb. As a result, the comparator 134 outputs the signal Sc instructing to set the "low standby power mode".

Upon receipt of the signal Sc instructing to set the "low standby power mode" and the signal Se indicating the "external mode", the oscillator circuit 101 outputs the oscillator signal Vosc for the driver circuit 102 to intermittently switch the NMOS transistors 32 and 33.

At time t9, in response to the microcontroller 15*a* outputting the signal ExtSTB for the control IC 50 to switch the NMOS transistors 32 and 33 in the "normal mode" (i.e., at the low level), the level of the voltage Vstb exceeds the predetermined level Vthstb. As a result, the comparator 134 outputs the signal Sc instructing to set the "normal mode".

Upon receipt of the signal Sc instructing to set the "normal mode" and the signal Se indicating the "external mode", the oscillator circuit 101 outputs the oscillator signal Vosc for the driver circuit 102 to continuously switch the NMOS transistors 32 and 33.

At time t10, similarly to time t7, since the AC input is 100 V, the communication circuit 135 outputs the pulse signal indicating that the effective value of the AC voltage Vac is low to the power factor correction IC 175 through the terminal STB.

An embodiment in which the control IC 50 changes the driving pattern in the "external mode" has been described above. Further, the control IC 50 can change the operation mode between the "interruption mode" of stopping operations of circuits other than the activation circuit 70 and the "energization mode" of operating circuits including the activation circuit 70, according to the logic level of the signal Wakeup.

In an embodiment of the present disclosure, by virtue of the configuration of the interface circuit 18*a*, the control IC 50 can appropriately switch the NMOS transistors 32 and 33 in the "normal mode" or the "low standby power mode" according to the logic level of the signal ExtSTB, after the activation.

This enables the control IC 50 to reduce its own power consumption when the control IC 50 is in the "interruption mode". Even when the control IC 50 operates in the "energization mode", the control IC 50 can change the driving pattern between the "normal mode" and the "low standby power mode" according to the logic level of the signal ExtSTB, thereby being able to reduce the power consumption of the DC-DC converter 13. The power consumption when the control IC 50 is in the "interruption mode" is smaller than the power consumption when the control IC 50 operates in the "normal mode" or the "low standby power mode".

<<<Configuration and Operation of Interface Circuit 18*b*>>>

Figure 15:
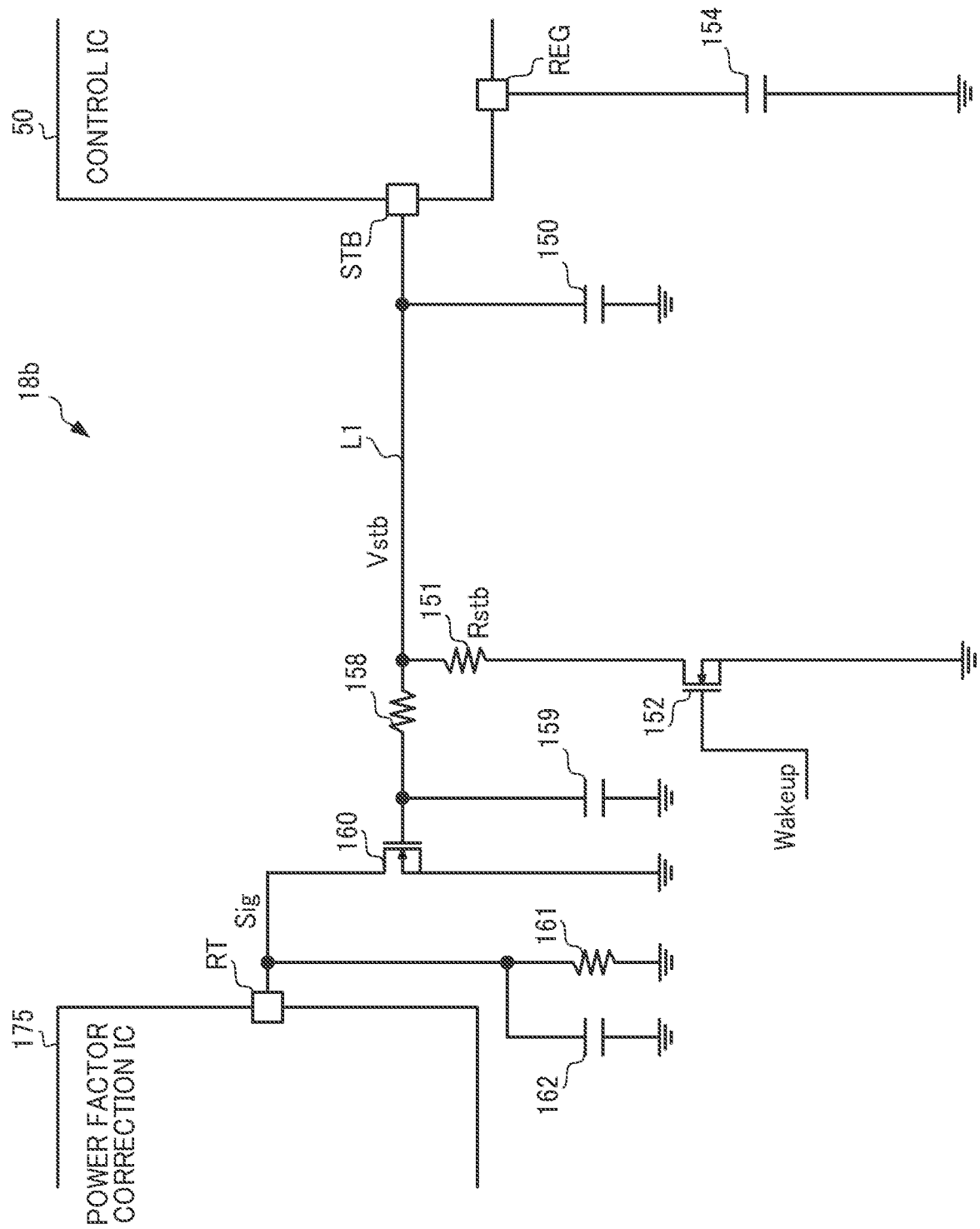
FIG. 15 is a diagram illustrating an example of an interface (IF) circuit 18b.

FIG. 15 is a diagram illustrating an example of the interface (IF) circuit 18*b*. The interface circuit 18*b* is used when changing the driving pattern in the "internal mode", and is obtained such that the NMOS transistors 153 and 157 and the resistors 155 and 156 are deleted from the interface circuit 18*a* in FIG. 9. Accordingly, details of the configuration of the interface circuit 18*b* will not be described.

<<Operation when Signal Wakeup is Low>>

Figure 16:
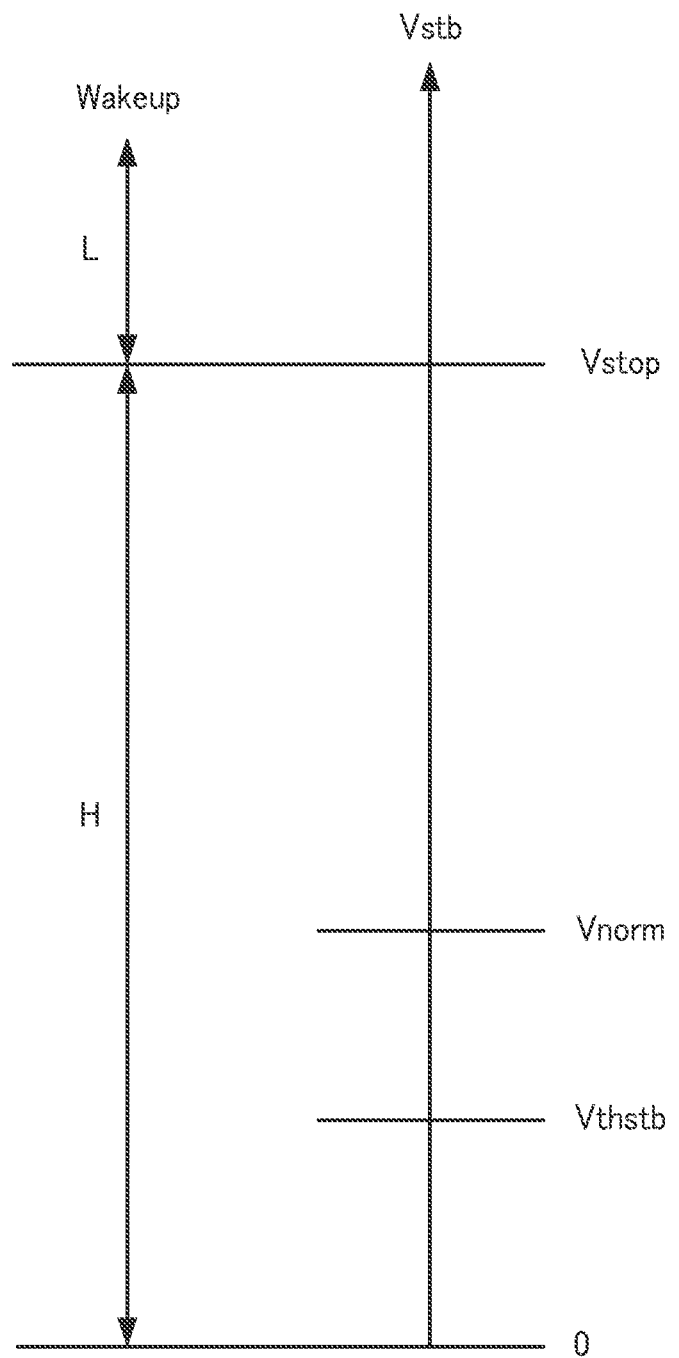
FIG. 16 is a diagram illustrating a relationship between a logic level of a signal Wakeup and a voltage Vstb.

Similarly to the case in FIG. 9, in response to the microcontroller 15*b* outputting the signal Wakeup to stop the DC-DC converter 13 (i.e., at the low level), the level of the voltage Vstb at the terminal STB exceeds the predetermined level Vstop as illustrated in FIG. 16. As a result, the interface circuit 18*b* causes the control IC 50 to be in the "interruption mode" as indicated in a row in which the signal Wakeup is low in FIG. 17.

<<Operation when Signal Wakeup is High>>

On the other hand, in response to the microcontroller 15*b* outputting the signal Wakeup to operate the DC-DC converter 13 (i.e., at the high level), the level of the voltage Vstb drops below the predetermined level Vstop as illustrated in FIG. 16. As a result, the interface circuit 18*b* causes the control IC 50 to operate in the "energization mode" as indicated in a row in which the signal Wakeup is high in FIG. 17.

<Description of Cooperation Function between Control IC 50 and Power Factor Correction IC 175>

When the driving pattern is changed in the "internal mode", the communication circuit 135 in FIG. 5 outputs the pulse signal to the power factor correction IC 175 according to the AC input and the operation mode of the control IC 50 such that the cooperation function between the control IC 50 and the power factor correction IC 175 is implemented, as illustrated in FIG. 17.

Specifically, as illustrated in FIG. 17, the communication circuit 135 changes the number of the pulses in the pulse signal according to the AC input (see, for example, (a) and (c) in a column of the pulse), and the pulse width of the pulse is changed according to the operation mode of the control IC 50 (see, for example, (a) and (b) in the column of the pulse).

Upon receipt of (a) the pulse signal having two pulses with pulse width of T1, the power factor correction IC 175 detects that the AC input is 100 V and that the operation mode should be changed to the continuous switching. Upon receipt of (b) the pulse signal having two pulses with pulse width of T2, the power factor correction IC 175 detects that the AC input is 100 V and that the operation mode should be changed to the intermittent switching.

Upon receipt of (c) the pulse signal having one pulse with pulse width of T1, the power factor correction IC 175 detects that the AC input is 200 V and that the operation mode should be changed to the continuous switching. In addition, upon receipt of (d) the pulse signal having one pulse with pulse width of T2, the power factor correction IC 175 detects that the AC input is 200 V and that the operation mode should be changed to the intermittent switching.

Furthermore, upon receipt of (e) the pulse signal having continuous pulses with pulse width of T3, the power factor correction IC 175 stops switching while receiving the pulse signal. When the control IC 50 is in the "interruption mode", the power factor correction IC 175 is stopped. The magnitude relationship among the pulse widths T1 to T3 is T2>T1>T3.

<Details of Signal Detection Circuit 191>

The signal detection circuit 191 in FIG. 13 detects the voltage Sig at the terminal RT that receives the pulse signal from the control IC 50, and detects an instruction related to the AC input and the switching, based on the number of the pulses and the pulse width of the pulse signal. Specifically, as described above, the signal detection circuit 191 detects that the AC input is 100 V when the pulse signal has two pulses.

The signal detection circuit 191 detects that the AC input is 200 V when the pulse has one pulse. This enables the power factor correction IC 175 to change the operation according to the type of the AC input indicated by the pulse signal, without the power factor correction IC 175 itself detecting the AC input.

Further, the signal detection circuit 191 detects that the control IC 50 instructs the power factor correction IC 175 to perform the "continuous switching", when the pulse signal has the pulse width T1. In this case, the signal detection circuit 191 outputs the low signal Vsb to the OR circuit 213. The power factor correction IC 175 then causes the signal Vdr to be low in response to the signal Vc1 outputted by the comparator 212.

The signal detection circuit 191 detects that the control IC 50 instructs the power factor correction IC 175 to perform the "intermittent switching" when the pulse signal has the pulse width T2. In this case, the signal detection circuit 191 outputs the high signal Vsb, in response to the voltage Vfb_b reaching a predetermined level V1, and outputs the low signal Vsb, in response to the voltage Vfb_b dropping to a predetermined level V2.

Accordingly, in response to the voltage Vfb_b reaching the predetermined level V1, the signal detection circuit 191 causes the signal Vdr to be low, such that the power factor correction IC 175 turns off the NMOS transistor 176. On the other hand, in response to the voltage Vfb_b dropping to the predetermined level V2, the signal detection circuit 191 causes the power factor correction IC 175 to drive the NMOS transistor 176 in response to the signal Vc1.

Additionally, when the pulse signal has the pulse width T3, the signal detection circuit 191 detects that the control IC 50 instructs the power factor correction IC 175 to stop switching while the control IC 50 outputting the pulse signal to the signal detection circuit 191. In this case, while receiving the pulse signal, the signal detection circuit 191 outputs the high signal Vsb, to cause the signal Vdr to be low, thereby causing the power factor correction IC 175 to turn off the NMOS transistor 176.

<<<Cooperation Operation between Control IC 50 and Power Factor Correction IC 175>>>

Figure 18:
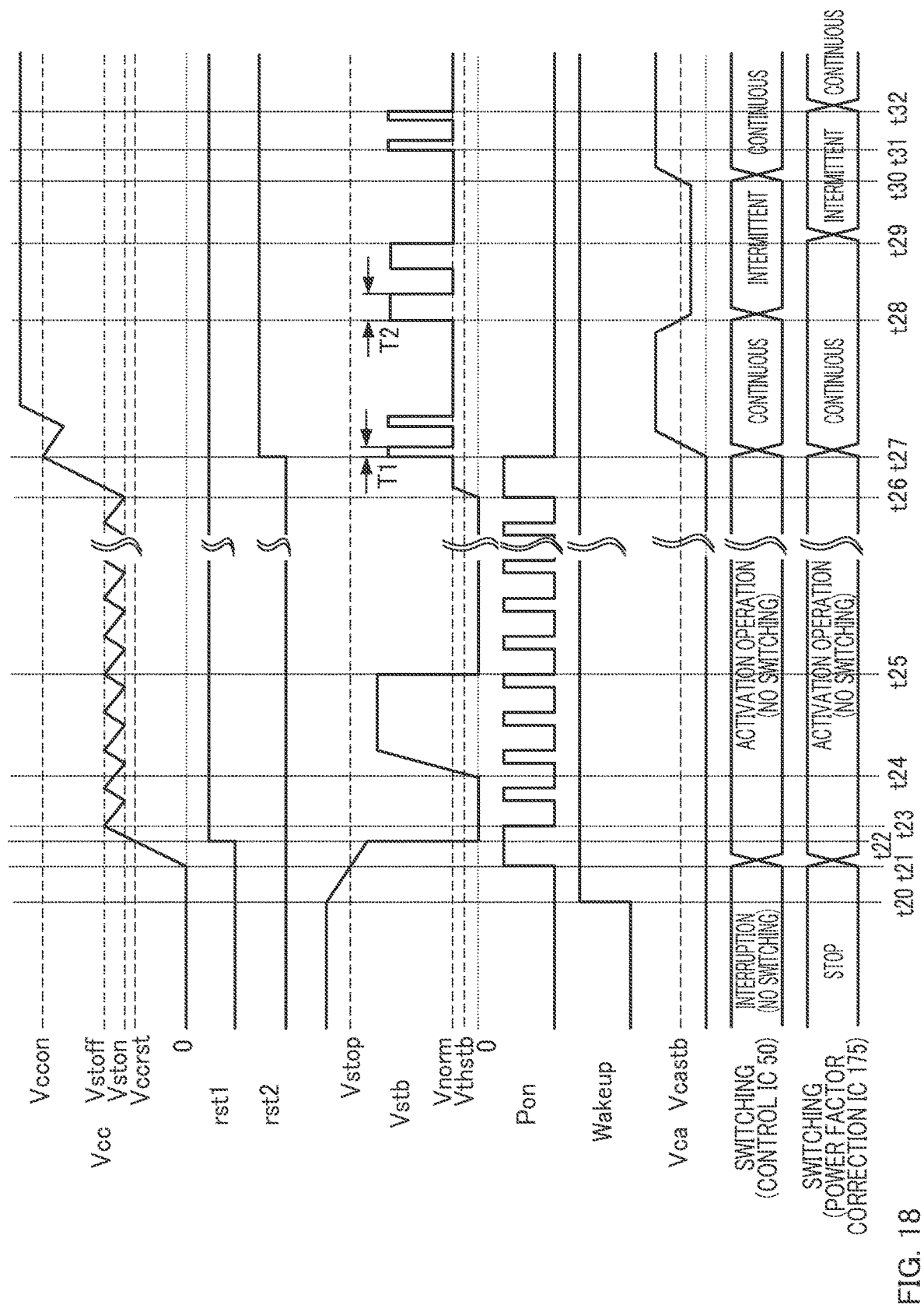
FIG. 18 is a diagram illustrating an example of operations of a control IC 50 and a power factor correction IC 175.

FIG. 18 is a diagram illustrating an example of operations of the control IC 50 and the power factor correction IC 175. FIG. 18 is an example of the operation of the control IC 50 when the control IC 50 changes the driving pattern in the "internal mode" after the activation of the control IC 50.

It is assumed that, before time t20, the microcontroller 15b outputs the signal Wakeup to stop the DC-DC converter 13 (i.e., at the low level). In this process, the control IC 50 is in the "interruption mode". It is also assumed that the effective value of the AC voltage Vac (i.e., the AC input) is 100 V.

Since the signal ExtSTB and the voltage Vreg1_div are not used as inputs in the interface circuit 18b, they are not given in FIG. 18. The operation of the control IC 50 from time t20 to time t27 in FIG. 18 corresponds to the operation of the control IC 50 from time t0 to time t7 in FIG. 14 except for the following points.

At time t25, the determination circuit 121 determines that the driving pattern is changed in the "internal mode", and outputs the signal Se indicating the "internal mode".

In a time period before time t21 in which the control IC 50 is in the "interruption mode", the power factor correction IC 175 stops the switching. In a time period from time t21, at which the control IC 50 shifts to the "energization mode", to time t27, at which the state setting period is completed and the continuous switching is started, the power factor correction IC 175 stops the switching. According to the above, the following describes the operations of the control IC 50 and the power factor correction IC 175 from time t27.

At time t27, in response to the level of the voltage Vcc exceeding the predetermined level Vccon, the under voltage protection circuit 91 outputs the signal rst2 to start operating the load detection circuit 100, the oscillator circuit 101, and the driver circuit 102 in FIG. 4. Since the level of the voltage Vcc reaches the predetermined level Vccon, the control circuit 81 outputs the signal Pon for the charging circuit 82 to stop charging the capacitor 61.

The oscillator circuit 101 operates similarly to the case at time t7 in FIG. 14. Similarly to the case at time t7 in FIG. 14, from this point, the capacitor 61 is charged with the current from the auxiliary coil L4. The communication circuit 135 operates similarly to the case at time t7 in FIG. 14.

In response to the level of the voltage Vcc exceeding the predetermined level Vccon, the power factor correction IC 175 starts continuous switching.

At time t28, the load detection circuit 100 in FIG. 4 outputs the voltage Vca at a level that is lower than the predetermined level Vcastb, and indicates that the state of the load 14 in FIG. 1 is a light load. As a result, upon receipt of the voltage Vca indicating that the state of the load 14 is a light load and the signal Se indicating the "internal mode", the oscillator circuit 101 outputs the oscillator signal Vosc for the driver circuit 102 to intermittently switch the NMOS transistors 32 and 33 in FIG. 3. The communication circuit 135 in FIG. 5 then outputs the pulse signal having two pulses with pulse width of T2.

At time t29, the power factor correction IC 175 detects that the AC input is 100 V and that the intermittent switching should be performed, based on the pulse signal. Thus, the power factor correction IC 175 starts intermittent switching.

At time t30, the load detection circuit 100 in FIG. 4 outputs the voltage Vca at a level that is higher than the predetermined level Vcastb, and indicates that the state of the load 14 in FIG. 1 is a heavy load. As a result, in response to receipt of the voltage Vca indicating that the state of the load 14 is a heavy load and the signal Se indicating the "internal mode", the oscillator circuit 101 outputs the oscillator signal Vosc for the driver circuit 102 to continuously switch the NMOS transistors 32 and 33.

At time t31, the communication circuit 135 in FIG. 5 outputs the pulse signal having two pulses with pulse width of T1.

At time t32, the power factor correction IC 175 detects that the AC input is 100 V and that the continuous switching should be performed, based on the pulse signal. Thus, the power factor correction IC 175 starts continuous switching.

An embodiment in which the control IC 50 changes the driving pattern in the "internal mode" has been described above. Further, the control IC 50 can change the operation mode between the "interruption mode" of stopping operations of circuits other than the activation circuit 70 and the "energization mode" of operating circuits including the activation circuit 70 are operated, according to the logic level of the signal Wakeup.

In an embodiment of the present disclosure, by virtue of the configuration of the interface circuit 18b, the control IC 50 can appropriately switch the NMOS transistors 32 and 33 in the "normal mode" or the "low standby power mode" according to the state of the load 14, after the activation.

This enables the control IC 50 to reduce its own power consumption when the control IC 50 is in the "interruption mode". Even when the control IC 50 operates in the "energization mode", the control IC 50 can change the driving pattern between the "normal mode" and the "low standby power mode" according to the state of the load 14, thereby being able to reduce the power consumption of the DC-DC converter 13. The power consumption when the control IC 50 is in the "interruption mode" is smaller than the power consumption when the control IC 50 operates in the "normal mode" or the "low standby power mode". The control IC 50 can cooperate with the power factor correction IC 175, and reduce the power consumption of the entire power supply device 10.

SUMMARY

The power supply device 10 according to an embodiment of the present disclosure has been described above. The control IC 50 includes the terminal STB, the determination circuit 73, the internal power supply 92, and the driver circuit 102. The control IC 50 controls the internal power supply 92 based on the voltage level at the terminal STB (the voltage Vstb), such that the internal power supply 92 stops generating the voltage Vreg1 when the control IC 50 operates in the "interruption mode". In response to the internal power supply 92 stopping generation of the voltage Vreg1, the control IC 50 can stop the operation of the circuit that operates upon receipt of the voltage Vreg1. This makes it possible to provide an integrated circuit capable of further reducing the power consumption.

The control IC 50 includes the terminal VH, the constant voltage source 80, and the current source 71. This enables the control IC 50 to supply the voltage Vstartup to the current source 71 and the determination circuit 73 while the rectified voltage Vrec1 is applied to the terminal VH, even when the control IC 50 is in the "interruption mode".

The control IC 50 includes the terminal VCC. Accordingly, the internal power supply 92 operates based on the voltage Vcc, and thus the control IC 50 expedites the internal power supply 92 stopping generation of the voltage Vreg1 with the voltage Vcc being reduced when it is in the "interruption mode".

The control IC 50 includes the charging circuit 82. Accordingly, the charging circuit 82 stops charging the capacitor 61, and thus the control IC 50 expedites the internal power supply 92 stopping generation of the voltage Vreg1 with the voltage Vcc being reduced when it is in the "interruption mode".

The control IC 50 includes the load detection circuit 100, the oscillator circuit 101, the determination circuit 121, and the comparator 134. This enables the control IC 50 to change the driving pattern of the NMOS transistors 32 and 33 in the "external mode" or the "internal mode".

The control IC 50 includes the communication circuit 135. This enables the control IC 50 to output the pulse signal to the power factor correction IC 175, to cooperate with the power factor correction IC 175, when the driving pattern is changed in the "internal mode".

The control IC 50 includes the terminal REG. This prevents the control IC 50 from malfunctioning even when erroneously receiving the signal ExtSTB from the microcontroller 15a during the state setting period.

The control IC 50 includes the discharging circuit 130 and the control circuit 120. This enables the control IC 50 to accurately determine a voltage corresponding to the resistance value Rstb of the resistor 151 during the state setting period.

The control IC 50 includes the internal power supply 93. This enables the control IC 50 to stop the operation of a circuit that operates upon receipt of the voltage Vreg2, when it is in the "interruption mode".

The control IC 50 includes the Zener diode 72. Accordingly, even when the capacitor 150 is charged by the current source 71, the voltage Vstb does not exceed a predetermined level.

The control IC 50 includes the terminal STB and the mode selection circuit (the determination circuit 73 and the comparator 134). In addition, the control IC 50 can operate in the "interruption mode", the "normal mode", or the "low standby power mode" based on the voltage level at the terminal STB (the voltage Vstb). This enables the control IC 50 to further reduce the power consumption.

The mode selection circuit can change the operation mode of the control IC 50 based on the voltage level at the terminal STB. This makes it possible to change the operation mode of the control IC 50 only by detecting the voltage level at the terminal STB.

The mode selection circuit includes the determination circuit 73 that operates even in the "interruption mode" and the comparator 134 that does not operate in the "interruption mode". This enables the control IC 50 to operate in the "normal mode" or the "low standby power mode" in the "energization mode" while reducing the power consumption during the "interruption mode".

The control IC 50 includes the load detection circuit 100, the oscillator circuit 101, and the setting circuit 76. This enables the control IC 50 to change the driving pattern of the NMOS transistors 32 and 33 in the "external mode" or the "internal mode".

The control IC 50 includes the communication circuit 135. The communication circuit 135 outputs a pulse signal that is lower than the predetermined level Vstop and higher than the predetermined level Vthstb. Accordingly, even when the voltage level at the terminal STB changes due to the pulse signal, the change in the operation mode of the control IC 50 is not affected.

The control IC 50 includes the internal power supply 92 and the driver circuit 102. The control IC 50 can control the internal power supply 92 based on the voltage level at the terminal STB (the voltage Vstb), and when operating in the "interruption mode", the control IC 50 can cause the internal power supply 92 to stop generating the voltage Vreg1. In response to the internal power supply 92 stopping generation of the voltage Vreg1, the control IC 50 can stop operation of the circuit that operates upon receipt of the voltage Vreg1.

The DC-DC converter 13 includes the interface circuit 18a. The interface circuit 18a includes the resistor 151 and the NMOS transistors 152, 153, and 157. This enables the interface circuit 18a to apply a voltage for setting the operation mode of the control IC 50 to the terminal STB, with the NMOS transistors 152, 153, and 157 being turned on and off.

With the NMOS transistor 152 being turned on and off, the interface circuit 18a can cause the control IC 50 to operate in the "interruption mode" or the "energization mode".

With the NMOS transistors 153 and 157 being turned on and off, the interface circuit 18a can cause the control IC 50 to operate in the "normal mode" or the "low standby power mode".

The present disclosure is directed to provision of an integrated circuit capable of further reducing the power consumption thereof.

According to the present disclosure, it is possible to provide an integrated circuit capable of further reducing the power consumption thereof.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit configured to generate an output voltage at a target level, the power supply circuit including
    a power transistor, the integrated circuit being configured to switch and drive the power transistor, and
    a first switch configured to be turned on and off in response to an instruction signal instructing an operation mode of the integrated circuit, the operation mode including a first mode and a second mode, a power consumption in the second mode being greater than a power consumption in the first mode,
the integrated circuit comprising:
    a first terminal to which the first switch is coupled;
    a first determination circuit configured to determine, based on a voltage level at the first terminal, whether to operate the integrated circuit in the first mode or the second mode;
    a first power supply voltage generation circuit configured to
        stop generating a first power supply voltage when the integrated circuit operates in the first mode, and
        generate the first power supply voltage when the integrated circuit operates in the second mode; and
    a driver circuit configured to receive the first power supply voltage, to thereby switch and drive the power transistor.

2. The integrated circuit according to claim 1, further comprising:
    a second terminal configured to receive a voltage corresponding to an alternating current (AC) voltage;
    a constant voltage source configured to generate a predetermined voltage based on the voltage received at the second terminal irrespective of the first and second modes; and
    a current source configured to supply a current to the first terminal, wherein
    the current source and the first determination circuit operate upon receipt of the predetermined voltage.

3. The integrated circuit according to claim 2, wherein the power supply circuit further includes
    a first capacitor, and
    a transformer including a primary coil, a secondary coil, and an auxiliary coil,
    the power transistor controls a current flowing through the primary coil of the transformer,
    the first capacitor is charged with a current from the auxiliary coil,
        the integrated circuit further includes a third terminal to which the first capacitor is coupled, and
    the first power supply voltage generation circuit operates based on a charge voltage of the first capacitor.

4. The integrated circuit according to claim 3, further comprising:
    a charging circuit configured to operate based on the predetermined voltage, to thereby charge the first capacitor, upon activation of the integrated circuit.

5. The integrated circuit according to claim 1, further comprising:
    a load detection circuit configured to output a first signal corresponding to a load of the power supply circuit;
    an oscillator circuit configured to output an oscillator signal corresponding to a third mode or a fourth mode, the third mode and the fourth mode being included in the second mode, and a state of the load being lighter in the fourth mode than in the third mode;
    a second determination circuit configured to determine, based on the voltage level at the first terminal, whether a change between the third mode and the fourth mode is performed in an internal mode, in which the change is performed inside the integrated circuit, or in an external mode, in which the change is performed outside the integrated circuit; and
    a first signal output circuit configured to output a second signal corresponding to the third mode or the fourth mode based on the voltage level at the first terminal, when the integrated circuit is in the external mode, wherein
    the power supply circuit further includes a resistor that is coupled in series with the first switch, and is coupled to the first terminal,
    the oscillator circuit
        outputs the oscillator signal in response to the first signal when the integrated circuit is in the internal mode, and
        outputs the oscillator signal in response to the second signal when the integrated circuit is in the external mode, and
    the driver circuit switches and drives the power transistor in response to the oscillator signal.

6. The integrated circuit according to claim 5, further comprising:
    a second signal output circuit configured to output a third signal, corresponding to the third mode or the fourth mode, to the first terminal in response to the first signal when the integrated circuit is in the internal mode.

7. The integrated circuit according to claim 5, further comprising:
a fourth terminal configured to receive the first power supply voltage, wherein the integrated circuit further includes
a second switch configured to be turned on in response to the first power supply voltage being applied to the fourth terminal, and
a third switch coupled in series with the second switch, and being configured to be turned on and off according to the third and fourth modes,
the second and third switches being coupled in parallel with the resistor; and
the first terminal is coupled with the second switch and the third switch.

8. The integrated circuit according to claim 5, wherein
the power supply circuit further includes a second capacitor coupled to the first terminal; and
the integrated circuit further comprises:
a discharging circuit configured to discharge the second capacitor coupled to the first terminal; and
a control circuit configured to control the discharging circuit such that the second capacitor is discharged before a current is supplied to the resistor, when the integrated circuit is activated in the second mode.

9. The integrated circuit according to claim 8, further comprising:
a second power supply voltage generation circuit configured to
stop generating a second power supply voltage when the integrated circuit operates in the first mode, and
generate the second power supply voltage when the integrated circuit operates in the second mode, wherein
the second power supply voltage is supplied to the control circuit.

10. The integrated circuit according to claim 1, further comprising:
a clamp device configured to clamp the voltage level at the first terminal to a predetermined level.

11. A power supply circuit configured to generate an output voltage at a target level, the power supply circuit comprising:
a power transistor;
an integrated circuit configured to drive the power transistor; and
a first switch configured to be turned on and off in response to an instruction signal instructing an operation mode of the integrated circuit, the operation mode including a first mode and a second mode, a power consumption in the second mode being greater than a power consumption in the first mode, wherein
the integrated circuit includes
a first terminal to which the first switch is coupled,
a first determination circuit configured to determine, based on a voltage level at the first terminal, whether to operate the integrated circuit in the first mode or the second mode,
a first power supply voltage generation circuit configured to
stop generating a first power supply voltage when the integrated circuit operates in the first mode, and
generate the first power supply voltage when the integrated circuit operates in the second mode, and
a driver circuit configured to receive the first power supply voltage, to thereby switch and drive the power transistor.

12. An integrated circuit for a power supply circuit configured to generate an output voltage at a target level, the power supply circuit including a power transistor, the integrated circuit being configured to switch and drive the power transistor, the integrated circuit comprising:
a first terminal to which an external circuit is coupled, the external circuit being configured to set an operation mode of the integrated circuit, the operation mode including
an interruption mode in which no switching operation is performed,
a normal mode in which a switching operation is continuously performed, and
a low standby power mode in which a switching operation period and a stop operation period alternately repeat; and
a mode selection circuit configured to select, based on a voltage level at the first terminal, whether the integrated circuit operates in the interruption mode, the normal mode, or the low standby power mode.

13. The integrated circuit according to claim 12, wherein the mode selection circuit causes
the integrated circuit to operate:
in the interruption mode when the voltage level at the first terminal is higher than a first voltage level,
in the normal mode when the voltage level is between the first voltage level and a second voltage level lower than the first voltage level, and
in the low standby power mode when the voltage level is lower than the second voltage level.

14. The integrated circuit according to claim 13, wherein the mode selection circuit includes
a first mode determination circuit configured to determine that the integrated circuit operates in the interruption mode, when the voltage level is higher than the first voltage level, and
a second mode determination circuit configured to
determine that the integrated circuit operates in the normal mode, when the voltage level is lower than the first voltage level and higher than the second voltage level, and
determine that the integrated circuit operates in the low standby power mode, when the voltage level is lower than the second voltage level.

15. The integrated circuit according to claim 13, further comprising:
an oscillator circuit configured to output an oscillator signal corresponding to the operation mode of the integrated circuit;
a load detection circuit configured to detect a state of a load of the power supply circuit; and
a setting circuit configured to set, based on the voltage level, a state of the oscillator circuit such that the oscillator circuit operates in an external mode in which the oscillator circuit operates based on the voltage level or an internal mode in which the oscillator circuit operates based on an output from the load detection circuit, in a state setting period for setting the state of the oscillator circuit while the integrated circuit is being activated, wherein
the oscillator circuit
outputs the oscillator signal corresponding to the voltage level, when the oscillator circuit operates in the external mode, and outputs the oscillator signal corresponding to an output from the load detection circuit, when the oscillator circuit operates in the internal mode.

16. The integrated circuit according to claim 15, further comprising:
a signal output circuit configured to output, to the first terminal, a signal at an amplitude level lower than the first voltage level and higher than the second voltage level.

17. The integrated circuit according to claim 13, further comprising:
a first power supply voltage generation circuit configured to
stop generating a first power supply voltage when the integrated circuit operates in the interruption mode, and
generate the first power supply voltage when the integrated circuit operates in the normal mode or the low standby power mode; and
a driver circuit configured to receive the first power supply voltage, to thereby switch and drive the power transistor.

18. A power supply circuit configured to generate an output voltage at a target level, the power supply circuit comprising:
the power transistor, the integrated circuit, and the external circuit according to claim 13, wherein the external circuit includes
a first signal line coupled to the first terminal,
a resistor having a first end coupled to the first signal line, and a second end,
a first switch coupled between the second end of the resistor and a ground,
a second switch having a first end and a second end, the first end being coupled to the first signal line, the second switch being configured to be turned on after activation of the integrated circuit is completed, and
a third switch coupled between the second end of the second switch and the second end of the resistor.

19. The power supply circuit according to claim 18, wherein the external circuit applies a voltage
that is at a level higher than the first voltage level to the first terminal upon turning off of the first switch, and
that is at a level lower than the first voltage level to the first terminal upon turning on of the first switch.

20. The power supply circuit according to claim 19, wherein the external circuit further applies a voltage
that is at a level between the first voltage level and the second voltage level to the first terminal, upon turning on of the first and second switches and turning off of the third switch, and
that is at a level lower than the second voltage level to the first terminal, upon turning on of the first, second, and third switches.

* * * * *